US009492736B2

(12) United States Patent
Rollo, III

(10) Patent No.: US 9,492,736 B2
(45) Date of Patent: Nov. 15, 2016

(54) ELECTRONIC GAMING DEVICE WITH DOMINO SYMBOLS

(75) Inventor: Donald James Rollo, III, Dacula, GA (US)

(73) Assignee: Cadillac Jack, Inc., Duluth, GA (US)

( * ) Notice: Subject to any disclaimer, the term of this patent is extended or adjusted under 35 U.S.C. 154(b) by 7 days.

(21) Appl. No.: 13/532,421

(22) Filed: Jun. 25, 2012

(65) Prior Publication Data

US 2013/0344934 A1 Dec. 26, 2013

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***A63F 9/20*** | (2006.01) |
| ***G07F 17/32*** | (2006.01) |
| *A63F 1/04* | (2006.01) |
| *A63F 3/00* | (2006.01) |
| *G07F 17/34* | (2006.01) |

(52) U.S. Cl.

CPC ............... *A63F 9/20* (2013.01); *G07F 17/326* (2013.01); *G07F 17/3262* (2013.01); *A63F 2001/0433* (2013.01); *A63F 2003/00996* (2013.01); *G07F 17/34* (2013.01)

(58) Field of Classification Search

USPC ...................................................... 463/16, 20

See application file for complete search history.

(56) References Cited

U.S. PATENT DOCUMENTS

| | | | | |
|---|---|---|---|---|
| 5,791,652 | A | 8/1998 | Nielsen | |
| 6,676,512 | B2 * | 1/2004 | Fong et al. | 463/20 |
| 7,354,344 | B2 * | 4/2008 | Paulsen et al. | 463/20 |
| 7,380,792 | B2 | 6/2008 | Taranino | |
| 2007/0021218 | A1 * | 1/2007 | Okada | G07F 17/32 463/47 |
| 2008/0318653 | A1 | 12/2008 | Lima et al. | |
| 2010/0124977 | A1 * | 5/2010 | DePalma et al. | 463/20 |
| 2011/0230251 | A1 * | 9/2011 | Nicely et al. | 463/20 |

* cited by examiner

*Primary Examiner* — Milap Shah
*Assistant Examiner* — Jason Pinheiro
(74) *Attorney, Agent, or Firm* — Weide & Miller, Ltd.

(57) ABSTRACT

Examples disclosed herein relate to systems and methods, which allow a player, the gaming device, and/or the gaming system to utilize domino symbols and/or domino gaming structures. The electronic gaming device may include a plurality of reels, a memory, and a processor. The plurality of reels may include one or more areas. The processor may generate one or more symbols to be located in the one or more areas. The one or more symbols may include one or more domino symbols. The processor may determine a payout based on a domino game structure.

21 Claims, 25 Drawing Sheets

ELECTRONIC GAMING DEVICE WITH DOMINO SYMBOLS

BACKGROUND

Field:

The subject matter disclosed herein relates to an electronic gaming device. More specifically, the disclosure relates to an electronic gaming device that provides gaming options with domino symbols.

Information:

The gaming industry has numerous casinos located both worldwide and in the United States. A client of a casino or other gaming entity can gamble via various games of chance. For example, craps, roulette, baccarat, blackjack, and electronic games (e.g., slot machines) where a person may gamble on an outcome.

Reels of an electronic gaming device (e.g., a slot machine) are utilized to display various symbols, which are utilized to determine whether a specific spin/activation of a game has resulted in a winning combination of these symbols. A new way of delivering this game play includes providing wagering gaming options, which may include domino symbols. In this disclosure, the gaming device and/or the gaming system may provide more excitement by utilizing domino symbols and/or domino rules.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
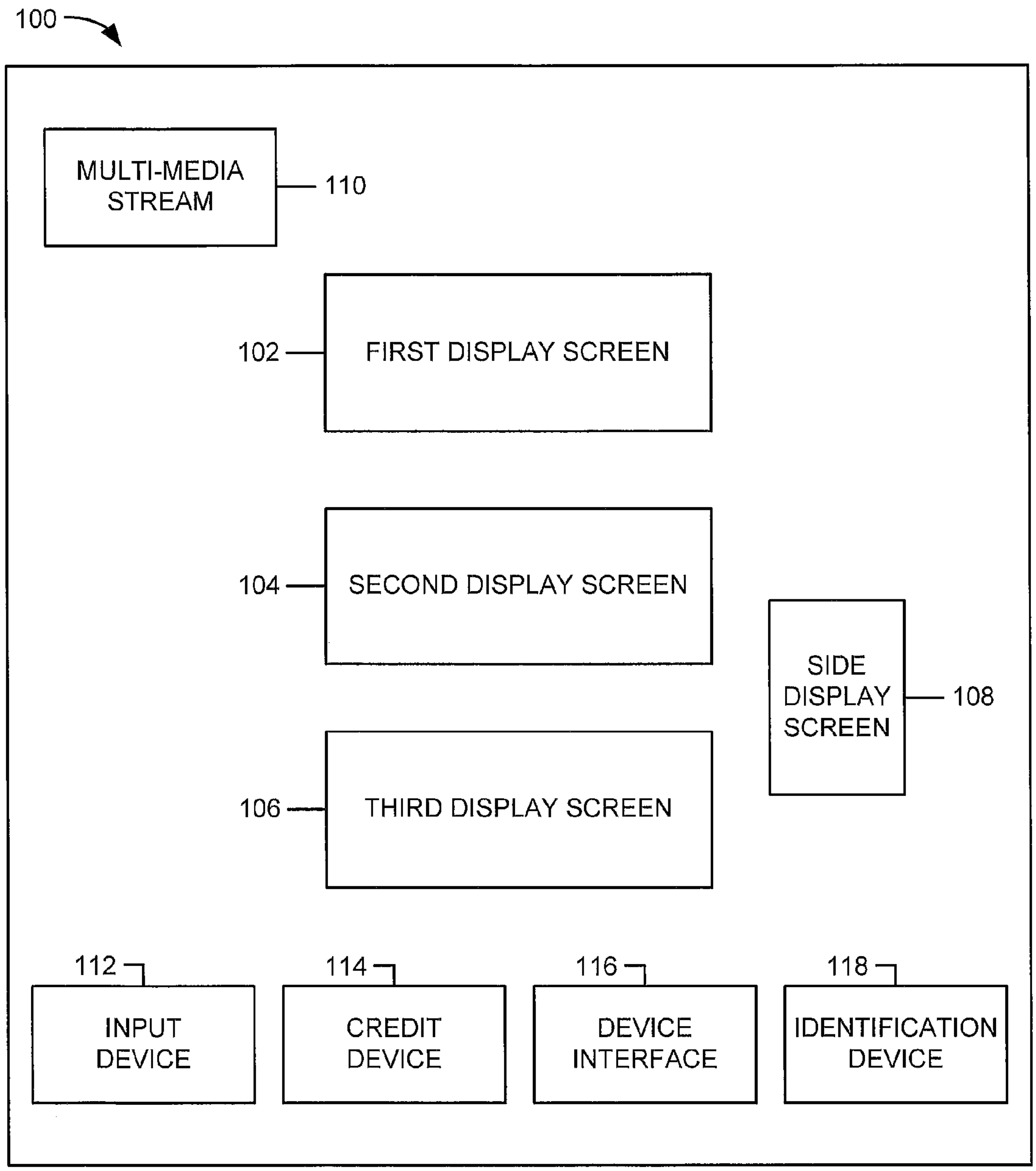
FIG. 1 is an illustration of the electronic gaming device, according to one embodiment.

FIG. 1 is an illustration of an electronic gaming device 100. Electronic gaming device 100 may include a multimedia stream 110, a first display screen 102, a second display screen 104, a third display screen 106, a side display screen 108, an input device 112, a credit device 114, a device interface 116, and an identification device 118. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an Internet event, and/or any combination thereof. In another example, the wagering event may be a poker tournament, a horse race, a car race, and/or any combination thereof. The advertisement may be an advertisement for the casino, a restaurant, a shop, any other entity, and/or any combination thereof. The sporting event may be a football game, a baseball game, a hockey game, a basketball game, any other sporting event, and/or any combination thereof. These multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 112 may be utilized to make a wager, to select a row and/or column to move, to select a row area to move, to select a column area to move, to select a symbol to move, to select a game rearranging optimization option, to modify electronic gaming device 100 (e.g., change sound level, configuration, font, language, etc.), to select a movie or song, to select live multi-media streams, to request services (e.g., drinks, slot attendant, manager, etc.), to select two-dimensional ("2D") game play, to select three-dimensional ("3D") game play, to select both two-dimensional and three-dimensional game play, to change the orientation of games in a three-dimensional space, to move a symbol (e.g., domino), or any combination thereof.

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface electronic gaming device 100 to a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, the Internet, and/or any combination thereof.

Device interface 116 may be utilized to connect a player to electronic gaming device 100 through a mobile device, card, keypad, identification device 118, or any combination thereof. Device interface 116 may include a docking station by which a mobile device is plugged into electronic gaming machine 100. Device interface 116 may include an over the air connection by which a mobile device is connected to electronic gaming machine 100 (e.g., Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, a row rearrangement option may be presented, a column rearrangement option may be presented, a row area rearrangement option may be presented, a column area rearrangement option may be presented, a two-dimensional gaming option may be presented, a three-dimensional gaming option may be presented, and/or the placement of gaming options may be modified based on player preference data. For example, a player may want to have domino gaming options only. Therefore, no non-domino gaming options would be presented.

Identification device 118 may utilize biometrics (e.g., thumb print, retinal scan, or other biometric). Identification device 118 may include a card entry slot into input device 112. Identification device 118 may include a keypad with an assigned pin number for verification. Identification device 118 may include multiple layers of identification for added security. For example, a player could be required to enter a player tracking card, and/or a pin number, and/or a thumb print, or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 will then automatically display the current baseball game onto side display screen 108 and/or an alternate display screen as set in the player's options.

First display screen 102 may be a liquid crystal display ("LCD"), a cathode ray tube display ("CRT"), organic light-emitting diode display ("OLED"), plasma display panel ("PDP"), electroluminescent display ("ELD"), a light-emitting diode display ("LED"), or any other display technology. First display screen 102 may be used for displaying primary games or secondary (bonus) games, advertising, player attractions, electronic gaming device 100 configuration parameters and settings, game history, accounting meters, events, alarms, or any combination thereof. Second display screen 104, third display screen 106, side display screen 108, and any other screens may utilize the same technology as first display screen 102 and/or any combination of technologies.

First display screen 102 may also be virtually combined with second display screen 104. Likewise second display screen 104 may also be virtually combined with third display screen 106. First display screen 102 may be virtually combined with both second display screen 104 and third display screen 106. Any combination thereof may be formed.

For example, a single large image could be partially displayed on second display screen 104 and partially displayed on third display screen 106, so that when both display screens are put together they complete one image. Electronic gaming device 100 may stream or play prerecorded multimedia 110, and the media may be displayed on first display screen 102.

Figure 2:
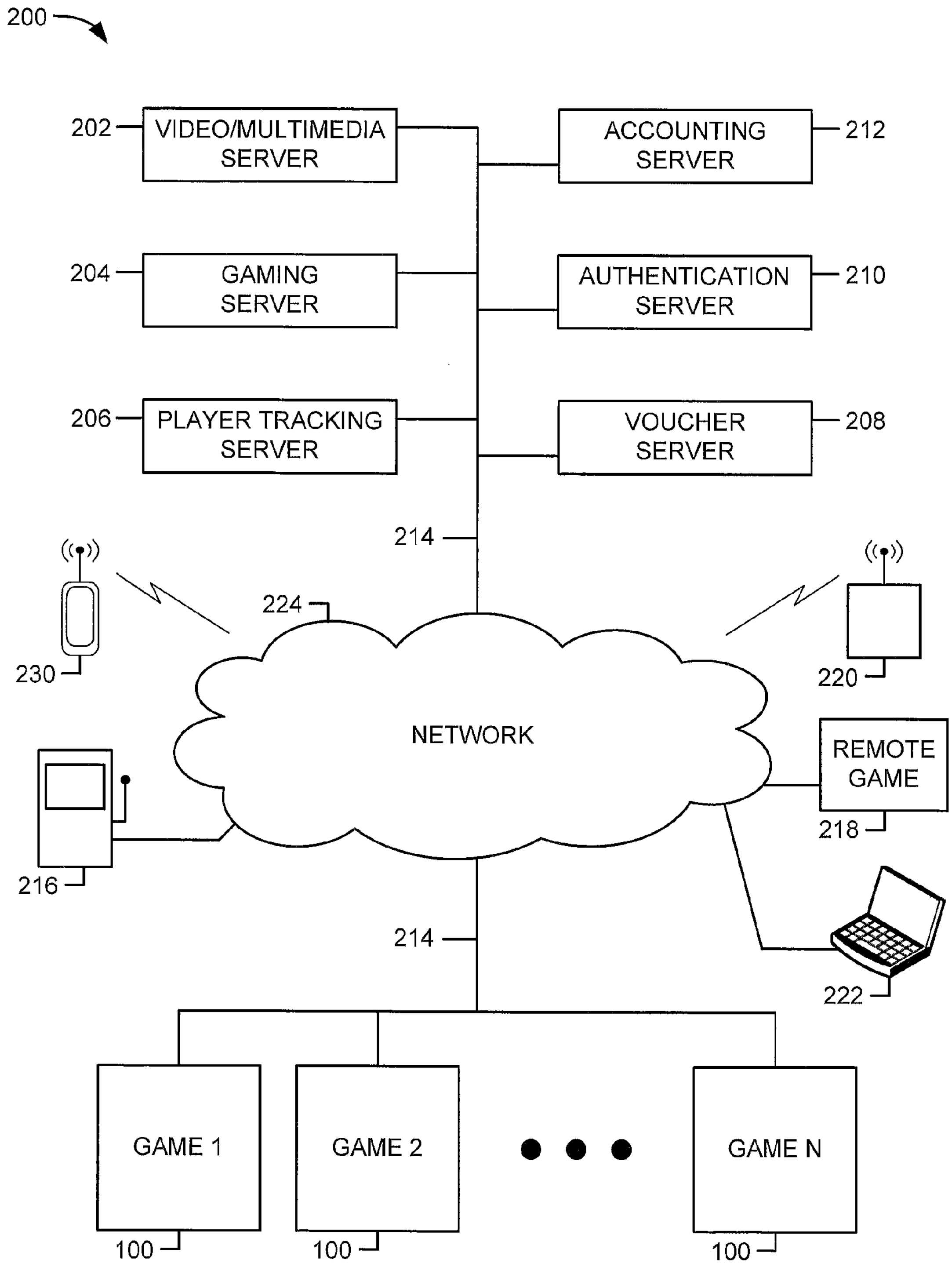
FIG. 2 is an illustration of an electronic gaming system, according to one embodiment.

In FIG. 2, an electronic gaming system 200 is shown. Electronic gaming system 200 may include a video/multimedia server 202, a gaming server 204, a player tracking server 206, a voucher server 208, an authentication server 210, and an accounting server 212.

Electronic gaming system 200 may include video/multimedia server 202, which may be coupled to network 224 via a network link 214. Network 224 may be the internet, a private network, or a network cloud. One or more video streams may be received at video/multimedia server 202 from other electronic gaming devices 100. Video/multimedia server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video/Multi-media server 202 may transmit these video streams via network link 214 and/or network 224.

For example, a remote gaming device at the same location may be a casino with multiple casino floors, a casino that allows wagering activities to take place from the hotel room, a casino that may allow wagering activities to take place from the pool area, etc. In another example, the remote devices may be at another location, such a progressive link to another casino, or a casino corporation that owns many different casinos (e.g., MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes.

Player tracking server 206 may track a player's betting activity, a player's preferences (e.g., language, font, sound level, drinks, etc.). Based on data obtained by player tracking server 206, a player may be eligible for gaming rewards (e.g., free play), promotions, and/or other awards (e.g., complimentary food, drinks, lodging, concerts, etc.).

Voucher server 208 may generate a voucher, which may include data relating to gaming. Further, the voucher may include payline structure option selections. In addition, the voucher may include columns, rows, and/or symbols that were modified.

Authentication server 210 may determine the validity of vouchers, player's identity, and/or an outcome for a gaming event.

Accounting server 212 may compile, track, and/or monitor cash flows, voucher transactions, winning vouchers, losing vouchers, and/or other transaction data. Transaction data may include the number of wagers, the size of these wagers, the date and time for these wagers, the identity of the players making these wagers, and/or the frequency of the wagers. Accounting server 212 may generate tax information relating to these wagers. Accounting server 212 may generate profit/loss reports for player's tracked outcomes.

Network connection 214 may be used for communication between dedicated servers, thin clients, thick clients, back-office accounting systems, etc.

Laptop computer 222 and/or any other electronic device (e.g., mobile phone 230, electronic gaming device 100, etc.) may be used for downloading new gaming device applications or gaming device related firmware through remote access.

Laptop computer 222 and/or any other electronic device (e.g., mobile phone 230, electronic gaming device 100, etc.) may be used for uploading accounting information (e.g., cashable credits, non-cashable credits, coin in, coin out, bill in, voucher in, voucher out, etc.).

Network 224 may be a local area network, a casino premises network, a wide area network, a virtual private network, an enterprise private network, the Internet, or any combination thereof. Hardware components such as network interface cards, repeaters and hubs, bridges, switches, routers, firewalls, or any combination thereof may also be part of network 224.

Figure 3:
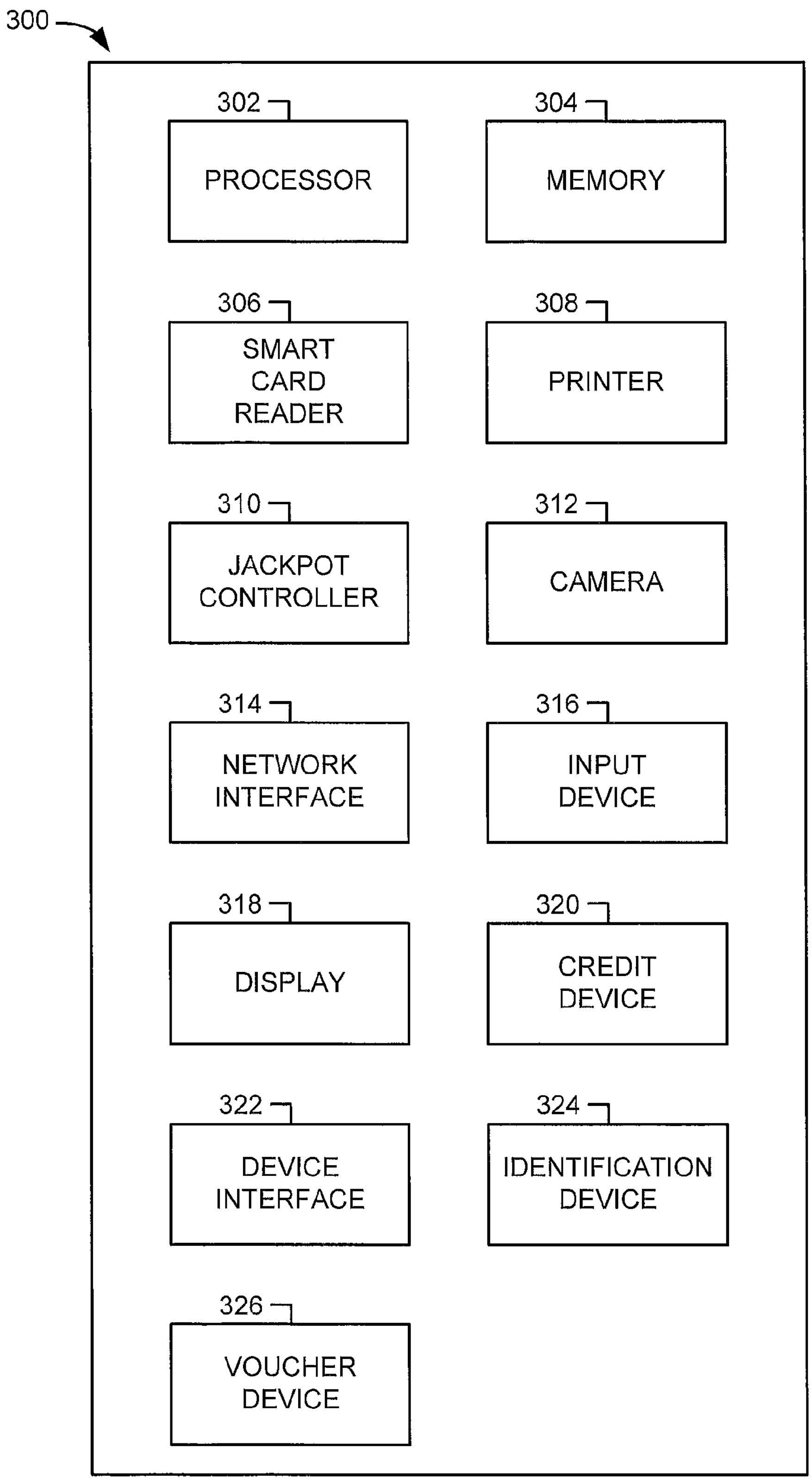
FIG. 3 is a block diagram of the electronic gaming device, according to one embodiment.

FIG. 3 shows a block diagram 300 of electronic gaming device 100. Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, and a voucher device 326.

Processor 302 may execute program instructions of memory 304 and use memory 304 for data storage. Processor 302 may also include a numeric co-processor, or a graphics processing unit (or units) for accelerated video encoding and decoding, or any combination thereof.

Processor 302 may include communication interfaces for communicating with electronic gaming device 100, electronic gaming system 200, and user interfaces to enable communication with all gaming elements. For example, processor 302 may interface with memory 304 to access a player's mobile device through device interface 322 to display contents onto display 318. Processor 302 may generate a voucher based on a wager confirmation, which may be received by an input device, a server, a mobile device, and/or any combination thereof. A voucher device may generate, print, transmit, or receive a voucher. Memory 304 may include communication interfaces for communicating with electronic gaming device 100, electronic gaming system 200, and user interfaces to enable communication with all gaming elements. For example, the information stored on memory 304 may be printed out onto a voucher by printer 308 and/or video or pictures captured by camera 312 may be saved and stored on memory 304. Memory 304 may include a confirmation module, which may authenticate a value of a voucher and/or the validity of the voucher. The processor may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory such as read-only memory ("ROM"), erasable programmable read-only memory ("EPROM"), electrically erasable programmable read-only memory ("EEPROM"), flash memory ("NVRAM"), or Nano-RAM (carbon nanotube random access memory), and/or any combination thereof.

Memory 304 may also be volatile semiconductor memory such as dynamic random access memory ("DRAM") or static random access memory ("SRAM"), and/or any combination thereof.

Memory 304 may also be a data storage device such as a hard disk drive, an optical disk drive such as CD, DVD, or Blu-ray, a solid state drive, a memory stick, a CompactFlash card, a USB flash drive, a Multi-media Card, an xD-Picture Card, or any combination thereof.

Memory 304 may be used to store read-only program instructions for execution by processor 302, for the read-write storage for global variables and static variables, read-write storage for uninitialized data, read-write storage for dynamically allocated memory, and for the read-write storage of the data structure known as "the stack", and/or any combination thereof.

Memory 304 may be used to store the read-only pay table information for which symbol combinations on a given payline that result in a win (payout) are established for games of chance such as slot games and video poker.

Memory 304 may be used to store accounting information (e.g., cashable electronic promotion in, non-cashable electronic promotion out, coin in, coin out, bill in, voucher in, voucher out, electronic funds transfer in, etc.).

Memory 304 may be used to record error conditions on an electronic gaming device 100 such as door open, coin jam, ticket print failure, ticket (paper) jam, program error, reel tilt, etc., or any combination thereof.

Memory 304 may also be used to record the complete history for the most recent game played, plus some number of prior games as may be determined by the regulating authority.

Smart card reader 306 may allow electronic gaming device 100 to access and read information provided by the player or technician, which may be used for setting the player preferences and/or providing maintenance information. For example, smart card reader 306 may provide an interface between a smart card (inserted by the player) and identification device 324 to verify the identity of a player.

Printer 308 may be used for printing slot machine payout receipts, slot machine wagering vouchers, non-gaming coupons, slot machine coupons (i.e., a wagering instrument with a fixed waging value that can only be used for non-cashable credits), drink tokens, comps, or any combination thereof.

Electronic gaming device 100 may include a jackpot controller 310, which may allow electronic gaming device 100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine their picture may be taken to include their image into the game play. A picture of a player may be an actual image as taken by camera 312. A picture of a player may be a computerized caricature of image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Video obtained by camera 312 may then be used as part of game play, or may be used for security purposes. For example, a camera located on electronic gaming device 100 may capture video of a potential illegal activity (e.g., tampering with the machine, crime in the vicinity, underage players, etc.).

Network interface 314 may allow electronic gaming device 100 to communicate with video server 202, gaming server 204, player tracking server 206, voucher server 208, authentication server 210, and/or accounting server 212.

Input device 316 may be mechanical buttons, electronic buttons, a touch screen, or any combination thereof. Input device 316 may be utilized to make a wager, to make an offer to buy or sell a voucher, to determine a voucher's worth, to cash in a voucher, to modify electronic gaming device 100 (e.g., change sound level, configuration, font, language, etc.), to select a movie or music, to select live video streams (e.g., sporting event 1, sporting event 2, sporting event 3), to request services (e.g., drinks, manager, etc.), or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow for game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's pre-established account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with their mobile device (e.g., smart phone) to receive information from and/or transmit information to electronic gaming device 100 (e.g., watch a movie, listen to music, obtain verbal betting options, verify identification, transmit credits, etc.).

Identification device 324 may be utilized to allow electronic gaming device 100 to determine an identity of a player. Based on information obtained by identification device 324, electronic gaming device 100 may be reconfigured. For example, the language, sound level, music, placement of video streams, placement of images, placement of gaming options, and/or the tables utilized may be modified based on player preference data.

For example, a player may have selected a specific baseball team (e.g., Atlanta Braves) under the sporting event preferences, the electronic gaming device 100 will then automatically (or via player input) display the current baseball game (e.g., Atlanta Braves vs. Philadelphia Phillies) onto side display screen 108 and/or alternate display screen as set in the player's options.

A voucher device 326 may generate, print, transmit, or receive a voucher. The voucher may represent a wagering option, a wagering structure, a wagering timeline, a value of wager, a payout potential, a payout, or any other wagering data. A voucher may represent an award, which may be used for other locations inside of the gaming establishment. For example, the voucher may be a coupon for the local buffet or a concert ticket.

Figure 4:
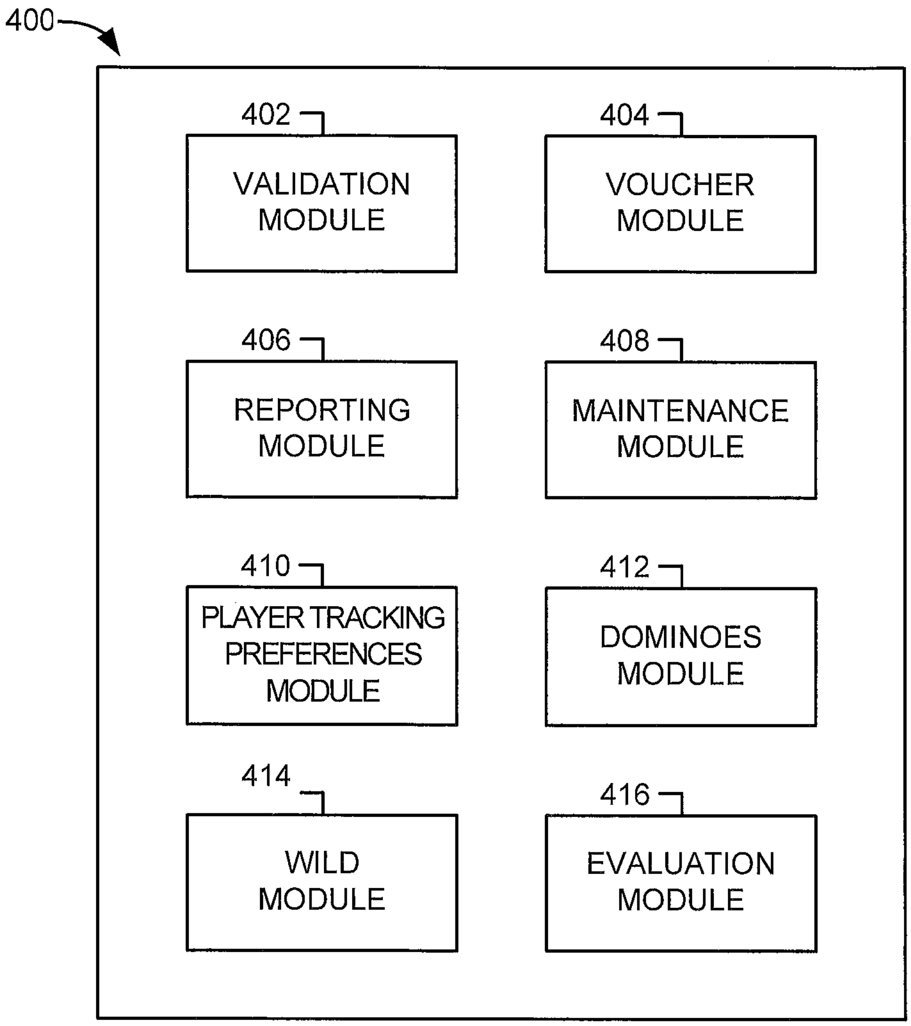
FIG. 4 is a block diagram of the electronic gaming device, according to one embodiment.

FIG. 4 shows a block diagram of memory 304, which includes various modules. Memory 304 may include a validation module 402, a voucher module 404, a reporting module 406, a maintenance module 408, a player tracking preferences module 410, a dominoes module 412, a wild module 414, and an evaluation module 416.

Validation module 402 may utilize data received from voucher device 326 to confirm the validity of the voucher.

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance and/or request a service call based on a device error.

Player tracking preferences module 410 may compile and track data associated with a player's preferences.

Dominoes module 412 may store various domino structures related to game results. For example, domino structures may include one-to-five dominoes in a row; one-to-five dominoes in a column; one domino in a first row, one domino in a third row, and one domino in a five row; one domino in a first column, one domino in a second column, one domino in a fourth column, and one domino in a fifth column; one domino in a first row, one domino in the first row, one domino in a third row, and one domino in a fifth row; and/or any combination that utilizes one or more spaces on one or more reels utilized by electronic gaming device 100 and/or electronic gaming system 200.

In another example, domino structures may include one or more potential outcomes based on one or more dominoes' potential positions. For example, dominoes' positions may be one or more positions as discussed in FIG. 5E. In these embodiments, dominoes module 412 may include up to eight different directional paylines based on one or more dominoes' potential positions.

In another example, processor 302 via dominoes module 412 (and/or wild module 414 and/or evaluation module 416) may determine that a domino has interacted with one or more other domino symbols, scatter symbols, and/or wild symbols.

Wild module 414 may determine payouts related to game results when there are one or more wild symbols utilized in the game results. For example, processor 302 via wild module 414 may determine that a wild has interacted with one or more other wild symbols, scatter symbols, and/or domino symbols.

Evaluation module 416 may determine payouts related to game results when there are no domino symbols.

It should be noted that dominoes module 412, wild module 414, and/or evaluation module 416 may be combined into one module. Further, there may be one evaluation module where the determined payout does not depend on whether there were any wild symbols, scatter symbols, and/or domino symbols.

In an exemplary embodiment, dominoes may be randomly placed on reels. Payouts may be determined based on the locations of the dominoes placed on the reels. These dominoes may be connected using standard dominoes gaming rules. Further, the base and/or bonus presentations may utilize toppling dominoes. In another embodiment, there may not be any reel strips of dominoes. There may or may not be any repeats. In one example, a payout may occur for two or more connected dominoes.

FIGS. 5A-5D are various interaction illustrations for domino symbols which may be utilized on an electronic gaming device, according to embodiments.

Figure 5A:
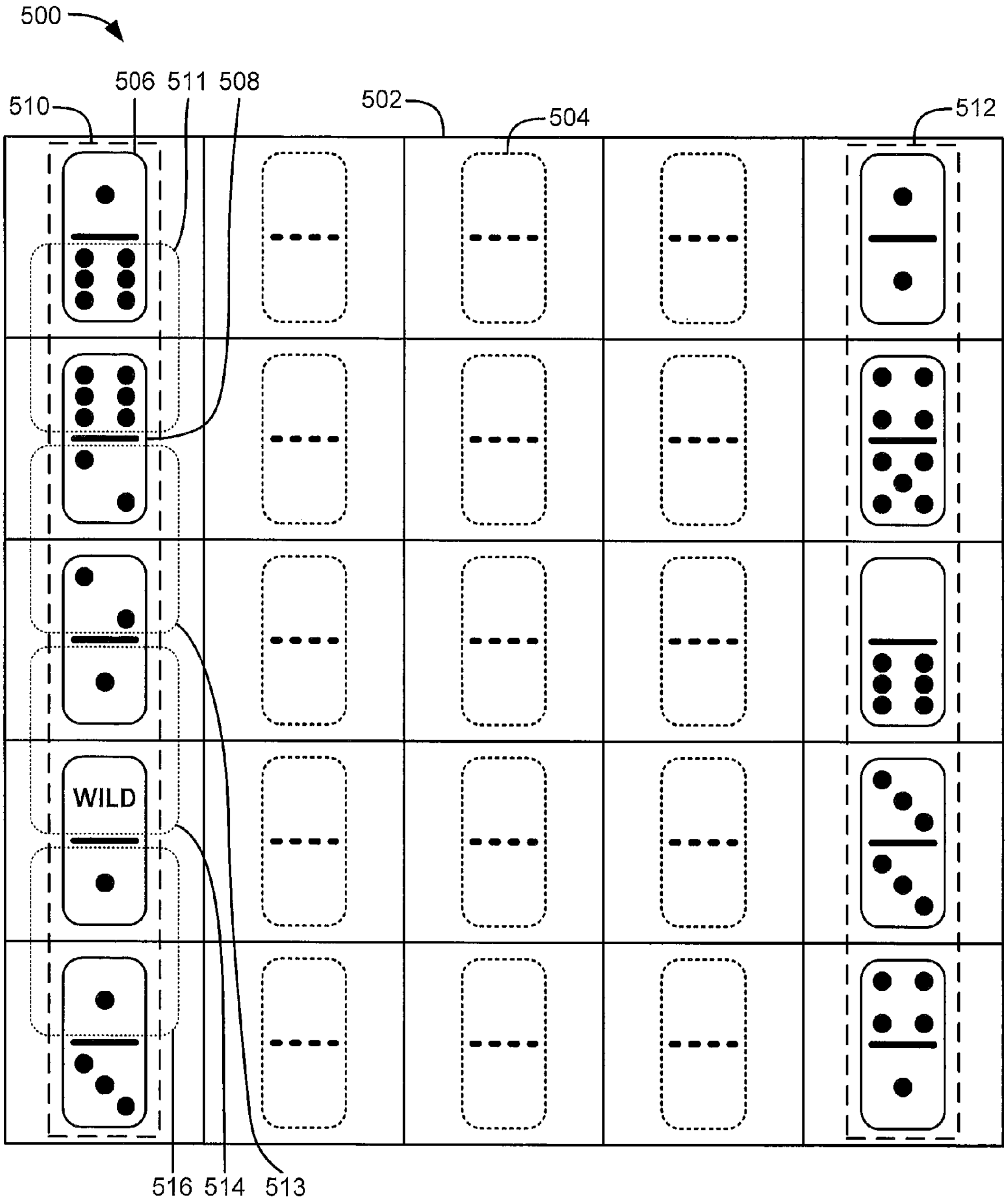
FIGS. 5A-5D are illustrations of various interactions for domino symbols which can be utilized on an electronic gaming device, according to embodiments.

In FIG. 5A, a first display image 500 may include a matrix 502. Matrix 502 may include a plurality of reels, a plurality of areas, a plurality of rows, a plurality of columns, and/or any combination thereof. In this embodiment, matrix 502 may include a first winning payline 510, a first non-winning payline 512, and blank symbols 504. Blank symbols 504 may be symbols that do not create a winning combination of symbols.

First winning payline 510 includes five domino symbols which are combined to form a winning combination. For example, a first domino symbol 506 includes two sides, which are represented by a first number (e.g., 1) and a second number (e.g., 6). In this example, a second domino symbol 508 includes two sides, which are represented by a third number (e.g., 6) and a fourth number (e.g., 2). The second number (e.g., 6) of first domino symbol 506 matches up with the third number (e.g., 6) of second domino symbol

508 to form a first match 511. Based on the numbers matching up in a similar manner, a second match 513, a third match 514, and a fourth match 516 may be formed. First match 511, second match 513, third match, and fourth match 516 may generate first winning paylines 510. The wild symbol utilized in third match 514 may be modified into any number required to form a match/winning situation. In this embodiment, first winning payline 510 is in the vertical direction.

First non-winning payline 512 may be a non-winning combination because none of symbols created matches. First non-winning payline 512 may be a non-winning combination when a predetermined number (e.g., 1, 3, 5, etc.) of matches have not be generated.

Figure 5B:
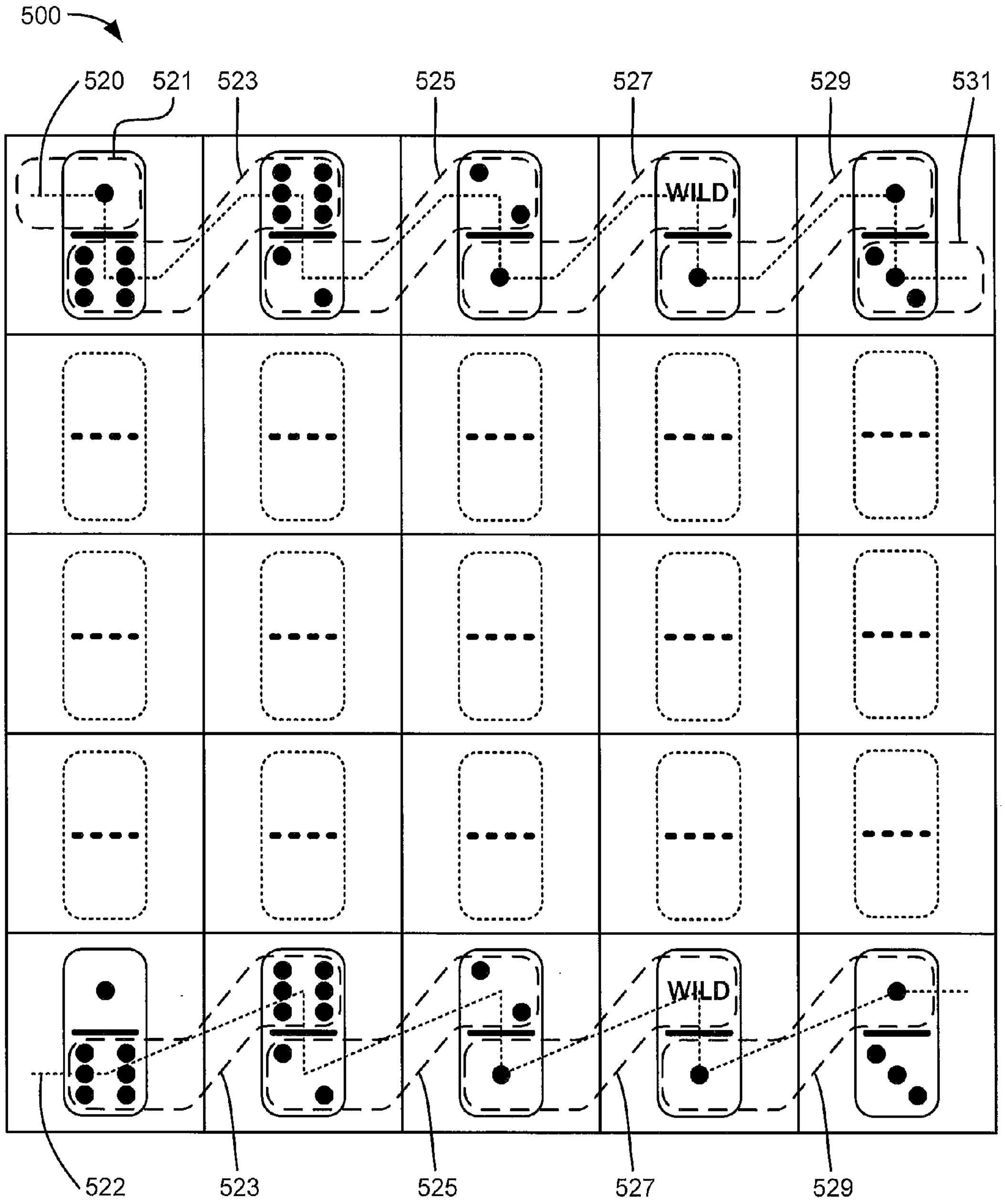
Figure 5C:
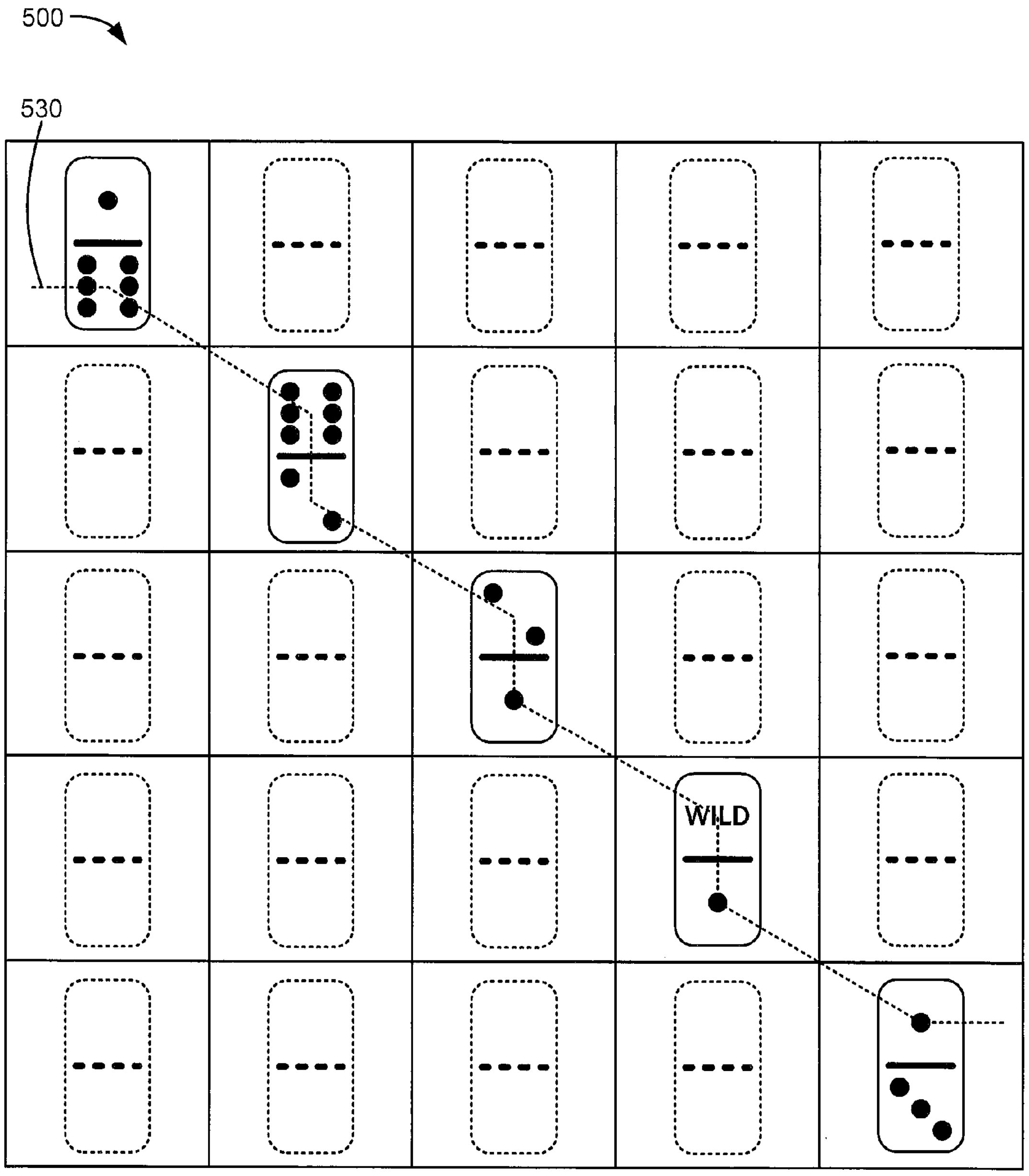

In FIG. 5B, a second payline 520 and a third payline 522 are shown, according to exemplary embodiments. Second payline 520 may include a fifth match 521, a sixth match 523, a seventh match 525, an eighth match 527, a ninth match 529, and a tenth match 531. In this example, fifth match 521 and tenth match 531 may form a match with a side of matrix 502. In another example, third payline 522 may not include symbols that may create matches with a side of matrix 502. In these examples, second payline 520 and third payline 522 are in the horizontal direction. In FIG. 5C, a fourth payline 530 which is located in a diagonal direction is shown, according to one embodiment.

Figure 5D:
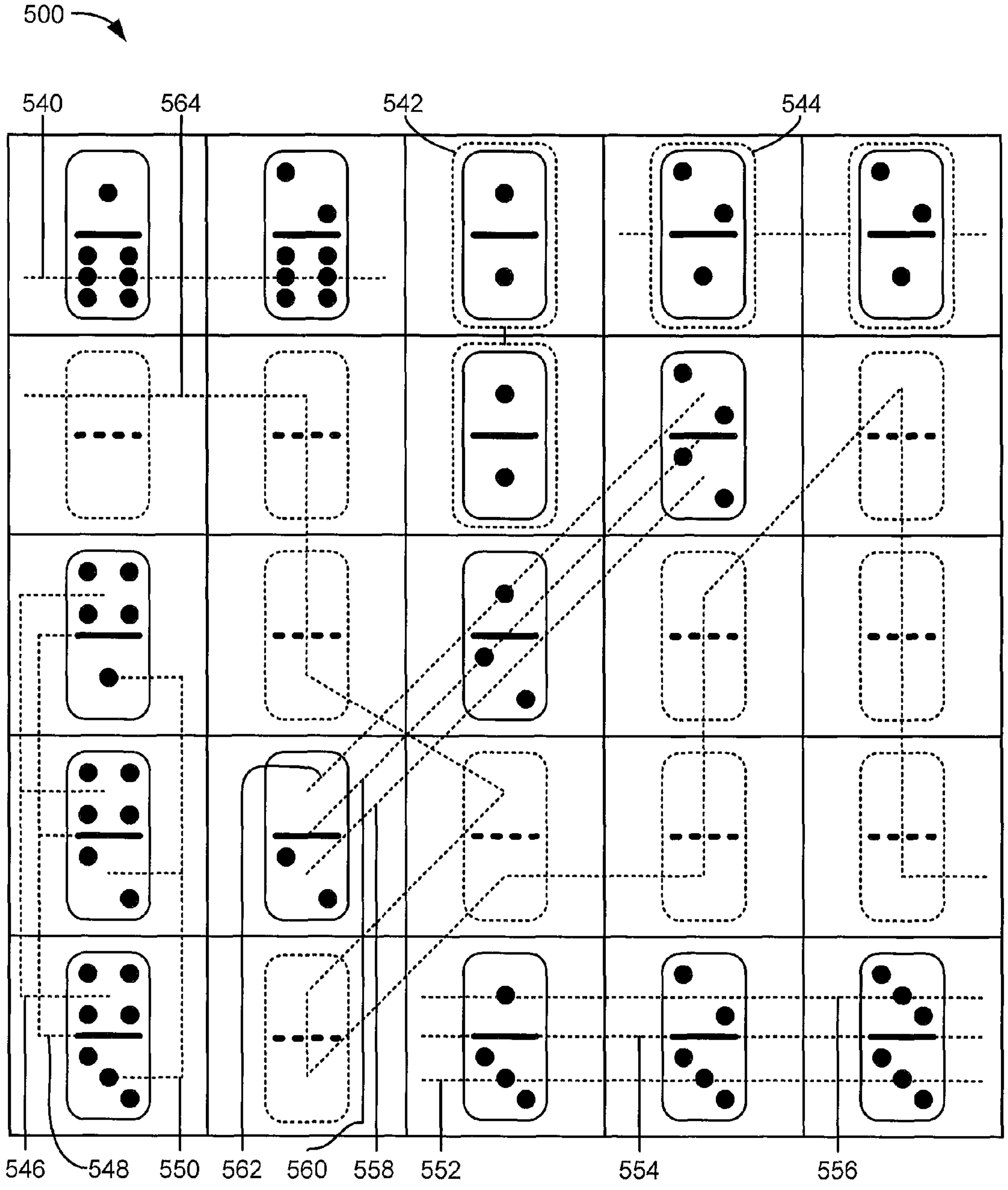

In FIG. 5D, various payline structures and matches are shown, according to embodiments. First display image 500 may include a fifth payline 540, a sixth payline 542, a seventh payline 544, an eighth payline 564, a ninth payline 546, a tenth payline 550, an eleventh payline 552, a twelfth payline 556, a thirteenth payline 558, a fourteenth payline 560, and a fifteenth payline 562.

Fifth payline 540 may be formed by two (or more) dominoes connecting their bottom tiles, which are each represented by the number 6. These two (or more) dominoes may have connected their top tiles, which are represented by the numbers 1 and 2, respectively. In another example, the two (or more) dominoes may have connected one top tile and one bottom tile.

Sixth payline 542 may be formed by two (or more) identical tiles in the vertical direction. Seventh payline 544 may be formed by two (or more) identical tiles in the horizontal direction.

Eighth payline 564 may be formed by two or more dominoes by utilizing one or more of the tiles for each of the dominoes in an extended payline. These tiles may be connected in the vertical directions, the horizontal directions, and/or the diagonal directions.

Ninth payline 546 may be formed by two (or more) dominoes with the same tile. In this example, all three dominoes have the same top tile (e.g., the number 4).

Tenth payline 550 may be formed by two (or more) dominoes with a tile pattern. In this example, the three dominoes have bottom tiles that form a number sequence of 1, 2, and 3. Any number sequence may be utilized. Some examples are: 1, 3, and 5; 2, 4, and 6; 0, 3, and 6; 0, 1, and 5; 4, 6, and 1, etc.

Eleventh payline 552 may be formed by two (or more) dominoes with the same tile. In this example, all three dominoes have the same bottom tile (e.g., the number 3).

Twelfth payline 556 may be formed by two (or more) dominoes with a tile pattern. In this example, the three dominoes have top tiles that form a number sequence of 1, 2, and 3.

Thirteenth payline 558 may be formed by two (or more) dominoes with the same tile. In this example, all three dominoes have the same bottom tile (e.g., the number 2) in a diagonal direction.

Fourteenth payline 560 may be formed by two (or more) dominoes with connecting points of each number in the tile. In this example, each tile is connected by one bullet (e.g., point) of the number 2 in each tile.

Fifteenth payline 562 may be formed by two (or more) dominoes with a tile pattern. In this example, the three dominoes have top tiles that form a number sequence of 0, 1, and 2 in a diagonal direction.

Figure 5E:
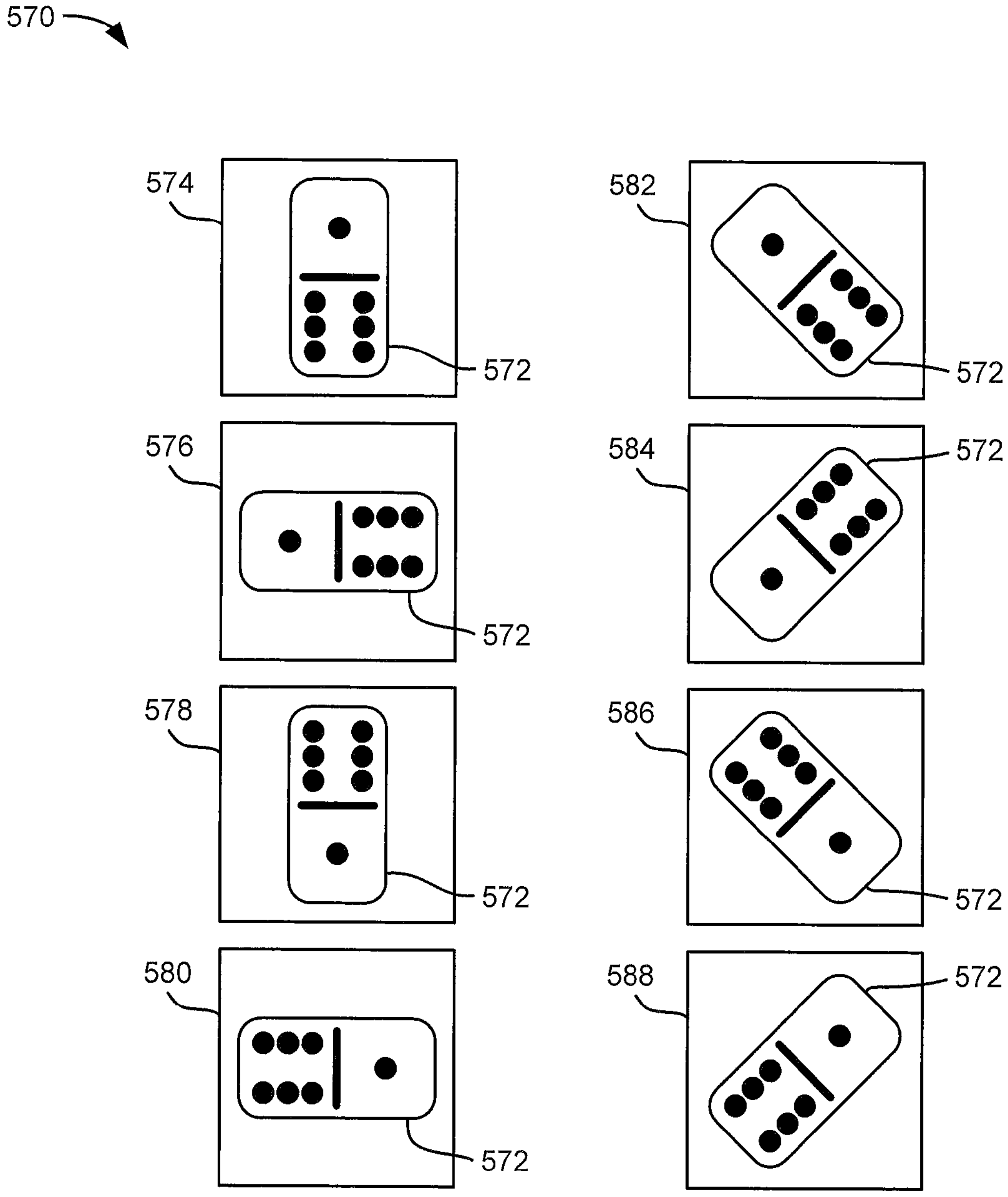
FIG. 5E is an illustration of the various positional changes for a domino symbol, according to embodiments.

FIG. 5E is an illustration 570 of the various positional changes for a domino symbol, according to embodiments. A movable domino 572 may be located in a first position 574, a second position 576, a third position 578, a fourth position 580, a fifth position 582, a sixth position 584, a seventh position 586, and an eighth position 588.

Figure 5F:
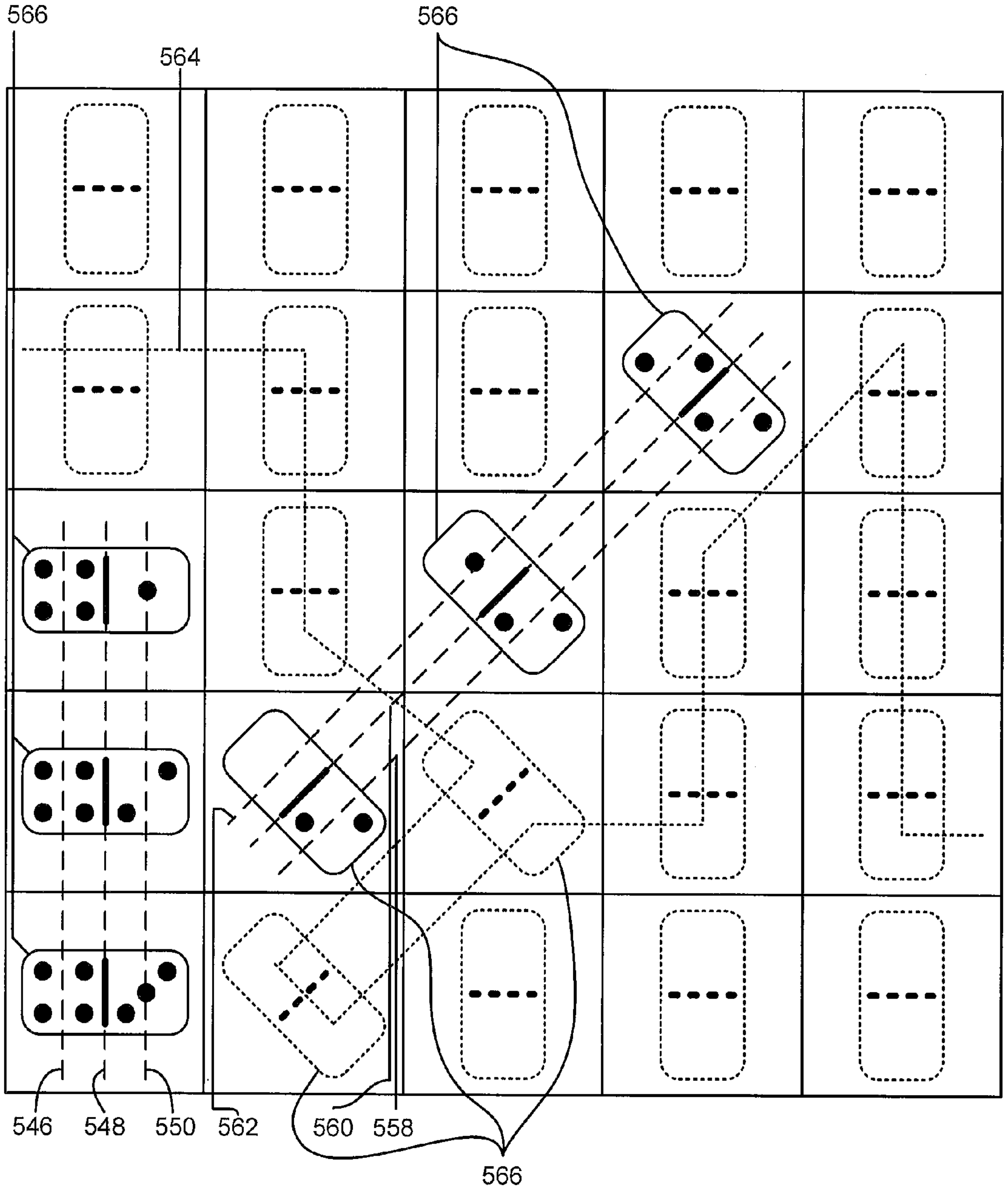
FIG. 5F is an illustration of the various paylines that may be utilized with domino symbols, according to embodiments.

FIG. 5F is an illustration of the various paylines that may be utilized with domino symbols, according to embodiments. In these examples, one or more dominoes may be rotated in fifth payline 540, sixth payline 542, seventh payline 544, eighth payline 564, ninth payline 546, tenth payline 550, eleventh payline 552, twelfth payline 556, thirteenth payline 558, fourteenth payline 560, and/or fifteenth payline 562

Figure 6A:
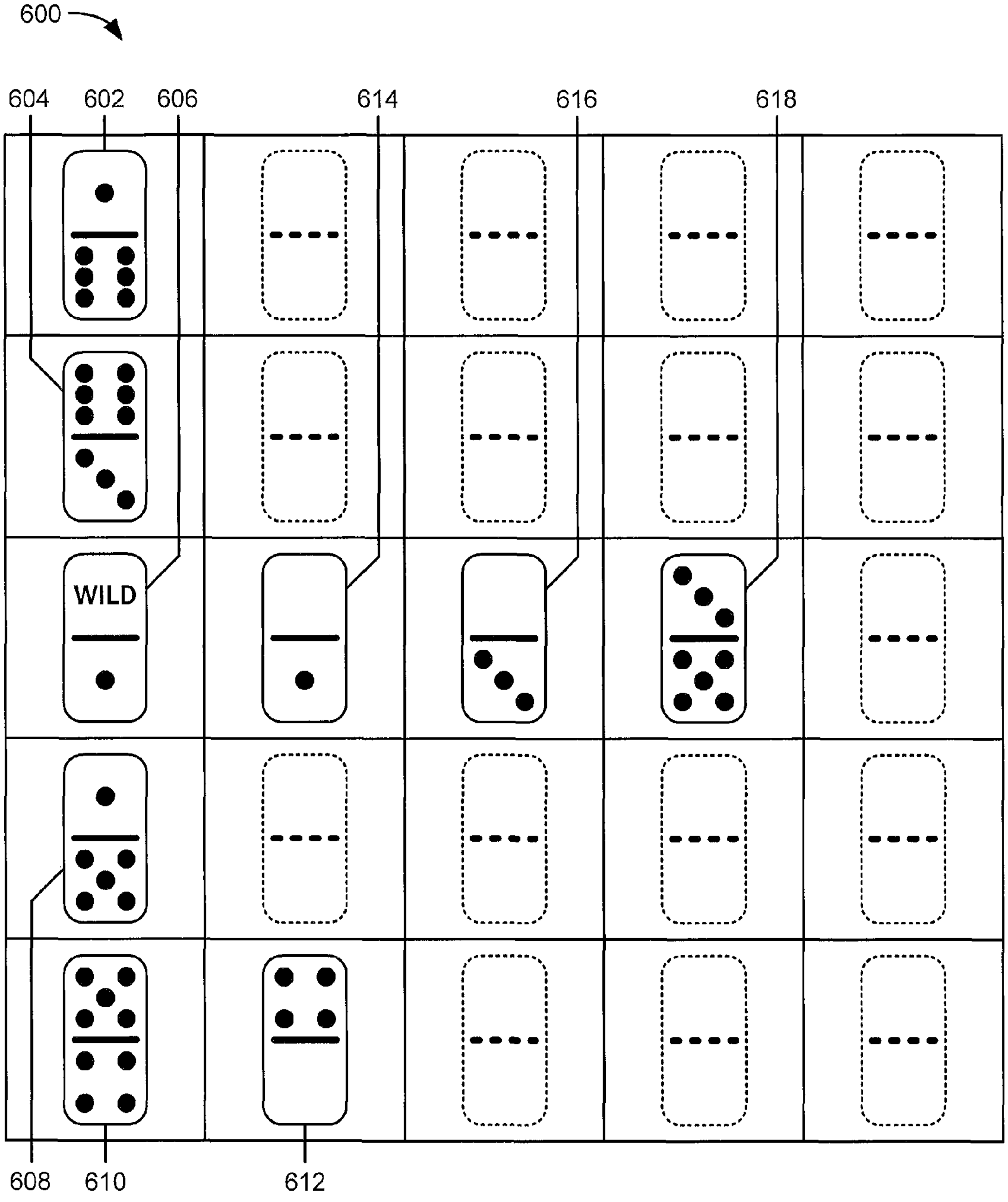
FIGS. 6A-6F are various illustrations of domino symbols interacting with other domino symbols, according to various embodiments.

FIGS. 6A-6F show various illustrations of domino symbols interacting with other domino symbols, according to various embodiments. In FIG. 6A, a second image 620 may include a first domino symbol 602, a second domino symbol 604, a third domino symbol 606, a fourth domino symbol 608, a fifth domino symbol 610, a sixth domino symbol 612, a seventh domino symbol 614, an eighth domino symbol 616, a ninth domino symbol 618, and various blank symbols. As shown in FIG. 5A, first winning payline 510 may be generated vertically by first domino symbol 602, second domino symbol 604, third domino symbol 606, fourth domino symbol 608, and/or fifth domino symbol 610. However, more paylines may be utilized by allowing the dominoes to rotate and/or change direction. This rotating feature may be part of the base game and/or a bonus game. In addition, this rotating feature may be part of a base bet and/or may require an additional side bet (e.g., ante bet).

Figure 6B:
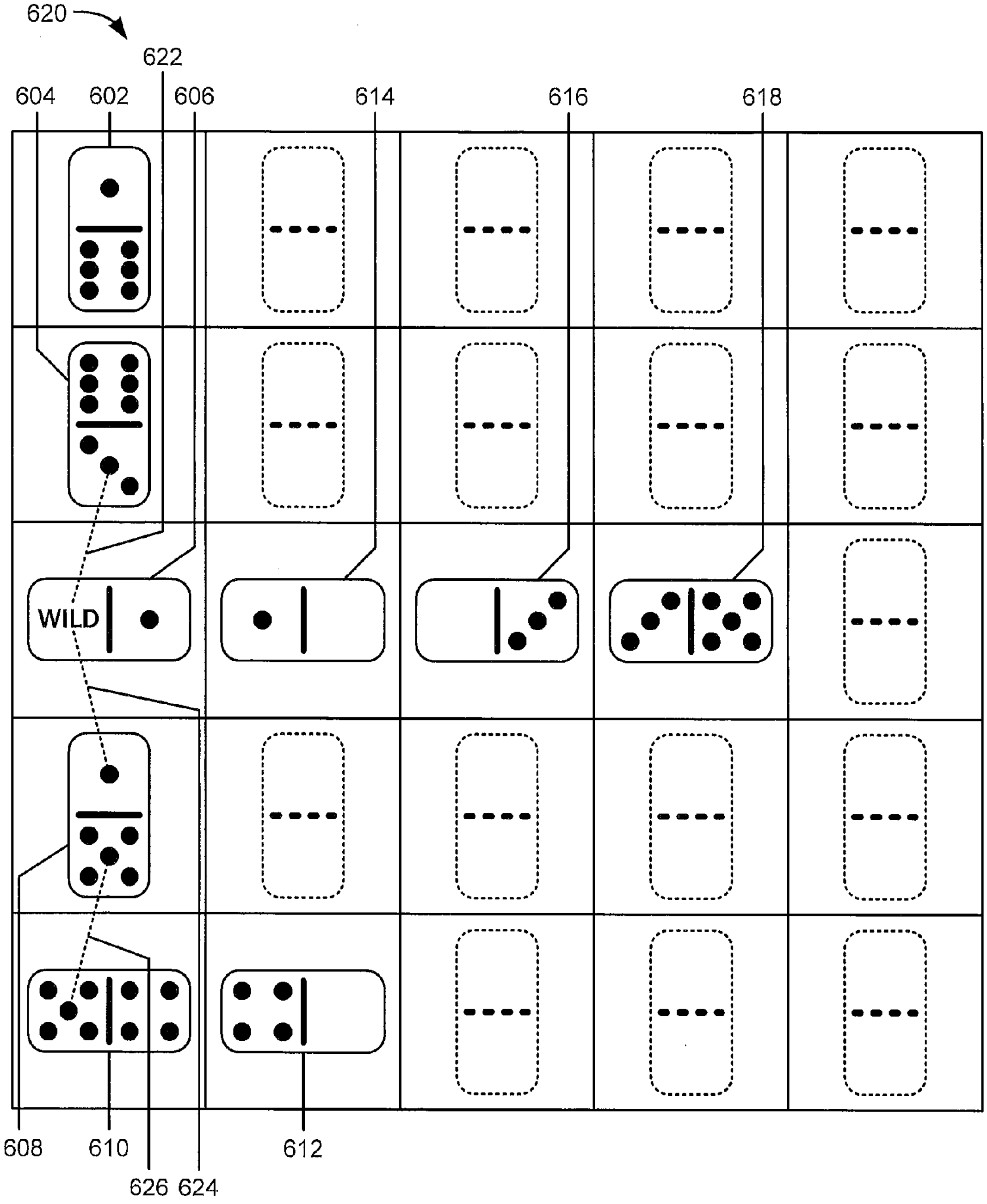

In FIG. 6B, third domino symbol 606, fifth domino symbol 610, sixth domino symbol 612, seventh domino symbol 614, eighth domino symbol 616, and ninth domino symbol 618 may have rotated in various directions to form new winning paylines. For example, third domino symbol 606 may rotate to second position 576. In another example, seventh domino symbol 614 may rotate to fourth position 580. A match may be generated by a tile (e.g., the number 3) on second domino symbol 604 which matches either of the tiles (e.g., wild or the number 1) on third domino symbol 606 because third domino symbol 606 has rotated. In another example, a match may be generated by a tile (e.g., the number 1) on fourth domino symbol 608 which matches either of the tiles (e.g., wild or the number 1) on third domino symbol 606 because third domino symbol 606 has rotated. A first rotating match 622 may be formed by second domino symbol 604 and third domino symbol 606. A second rotating match 624 may be formed by third domino symbol 606 and fourth domino symbol 608. A third rotating match 626 may be formed by fourth domino symbol 608 and fifth domino symbol 610.

Figure 6C:
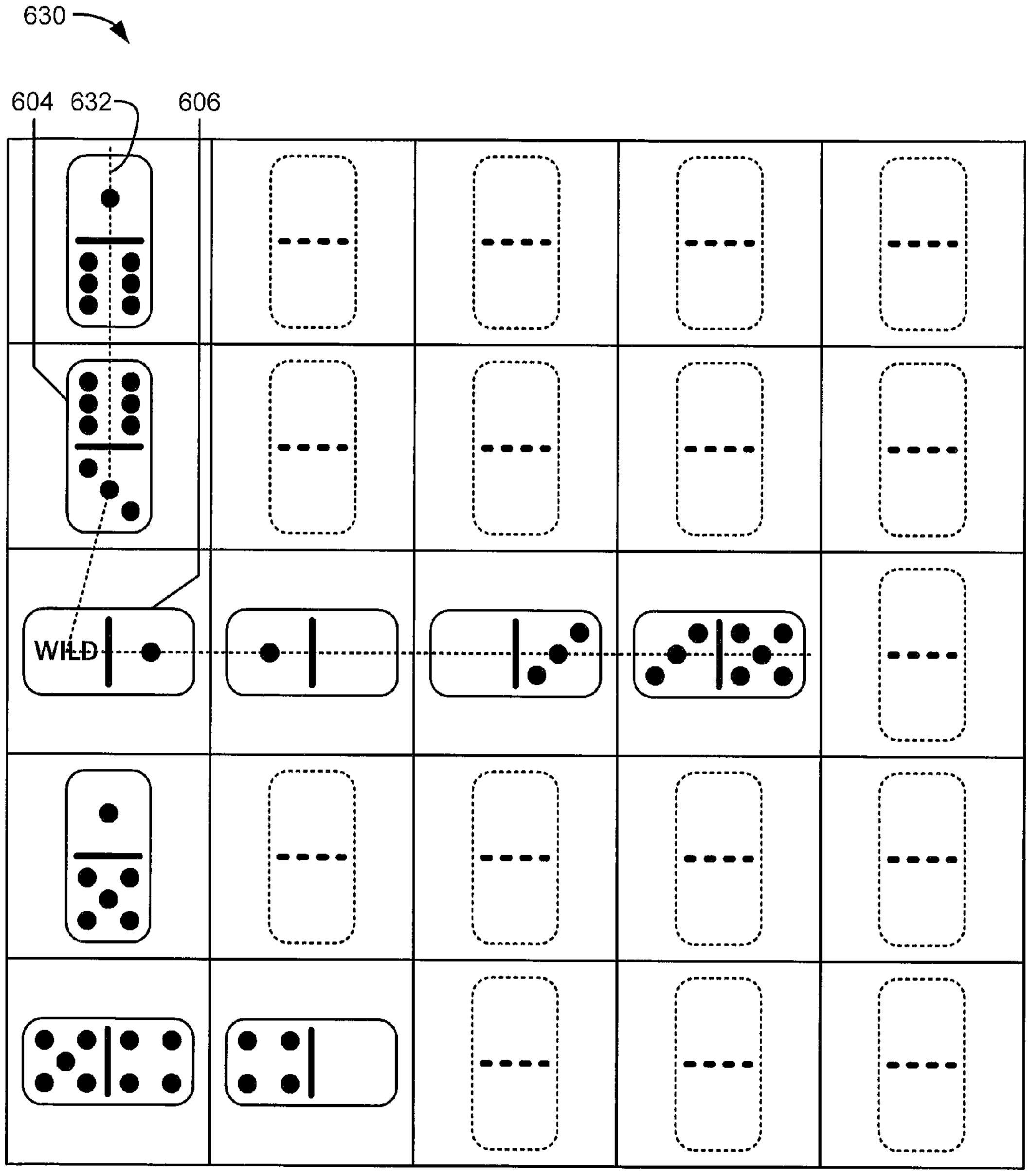

In FIG. 6C, a first rotated symbol payline 632 is shown, according to one embodiment. First rotated symbol payline 632 includes six symbols (e.g., first domino symbol 602, second domino symbol 604, third domino symbol 606, seventh domino symbol 614, eighth domino symbol 616, and ninth domino symbol 618). It should be noted that if the number 3 symbol on second domino symbol 604 was replaced with a number 1 symbol, then second domino symbol 604 may have formed a match with third domino symbol 606 utilizing either the wild symbol or the number 1 symbol of third domino symbol 606.

In an example, the number of dominoes that may be able to rotate may be based on the number of side bets placed, the size of the side bet placed, the number of rotating bonuses achieved, the number of rotating bonuses accumulated, a game level, a player's session time, and/or any other criteria. In another example, the number of dominoes that may be able to rotate may be determined by a random number generator, a predetermined number, and/or any combination of the above.

For example, a player may unlock (e.g., allow to rotate) one or more symbols based on each additional side bet placed. If the player makes a one credit side bet, then a specific number of symbols (e.g., N) may be allowed to rotate. If the player makes a two credit side bet, then 2N number of symbols may be allowed to rotate. N may be any number from 1 to the maximum number of areas in matrix 502.

In another example, a player may unlock (e.g., allow to rotate) one or more symbols based on size of the side bet placed. If the player makes a bet of $1, then a specific number of symbols (e.g., N) may be allowed to rotate. If the player makes a bet of $5, then 3N number of symbols may be allowed to rotate. For any example described in this disclosure, any ratio may be utilized (1:1; 1:1.25; 1:1.5; 1:1.6; 1:2; 1:2.3; 1:3, etc.).

Figure 6D:
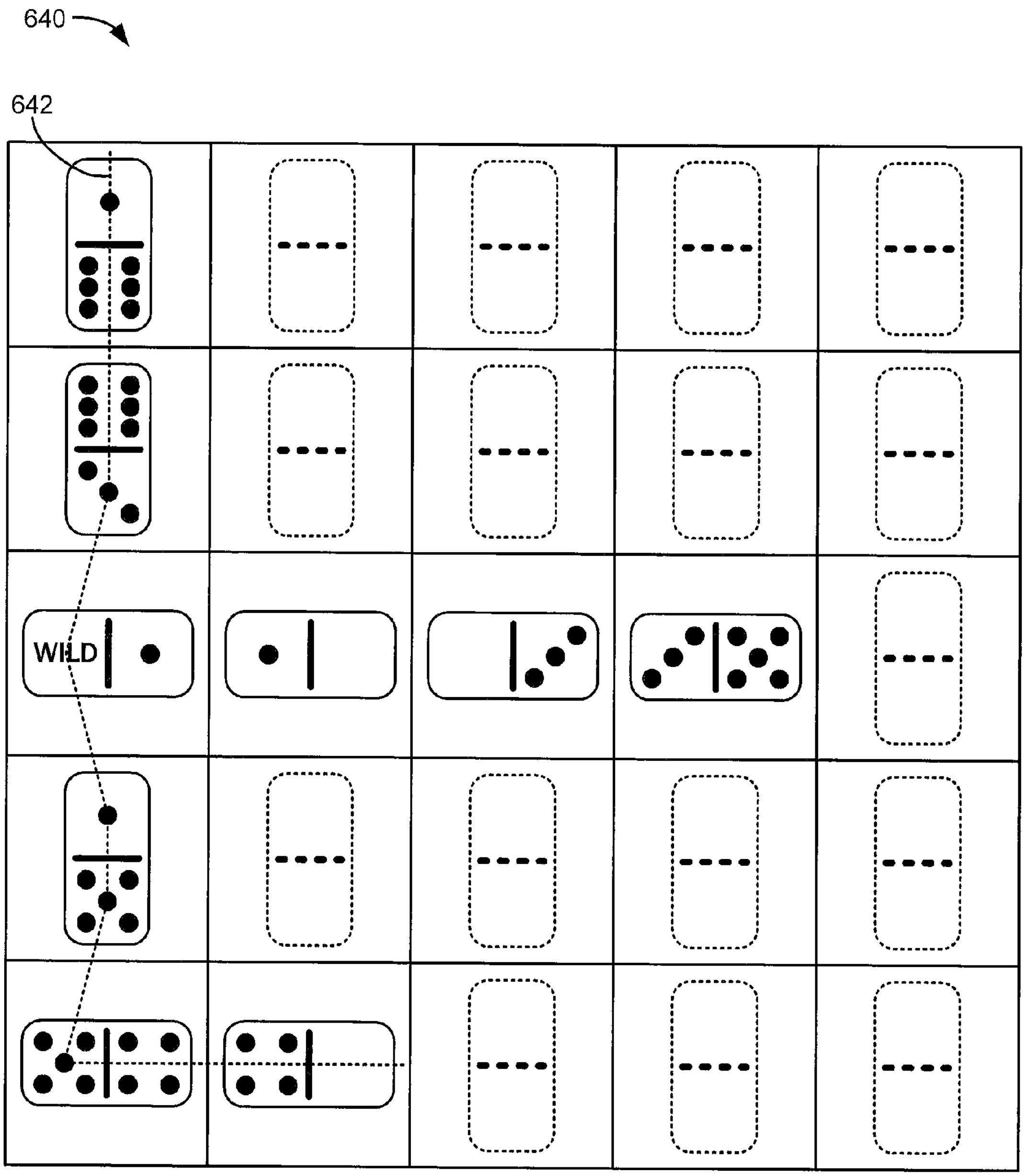

In FIG. 6D, a second rotated symbol payline 642 is shown, according to one embodiment. Second rotated symbol payline 642 includes six symbols (e.g., first domino symbol 602, second domino symbol 604, third domino symbol 606, fourth domino symbol 608, fifth domino symbol 610, and sixth domino symbol 612). It should be noted that if the number 3 symbol on second domino symbol 604 was replaced with a number 1 symbol, then second domino symbol 604 may have formed a match with third domino symbol 606 utilizing either the wild symbol or the number 1 symbol of third domino symbol 606.

Figure 6E:
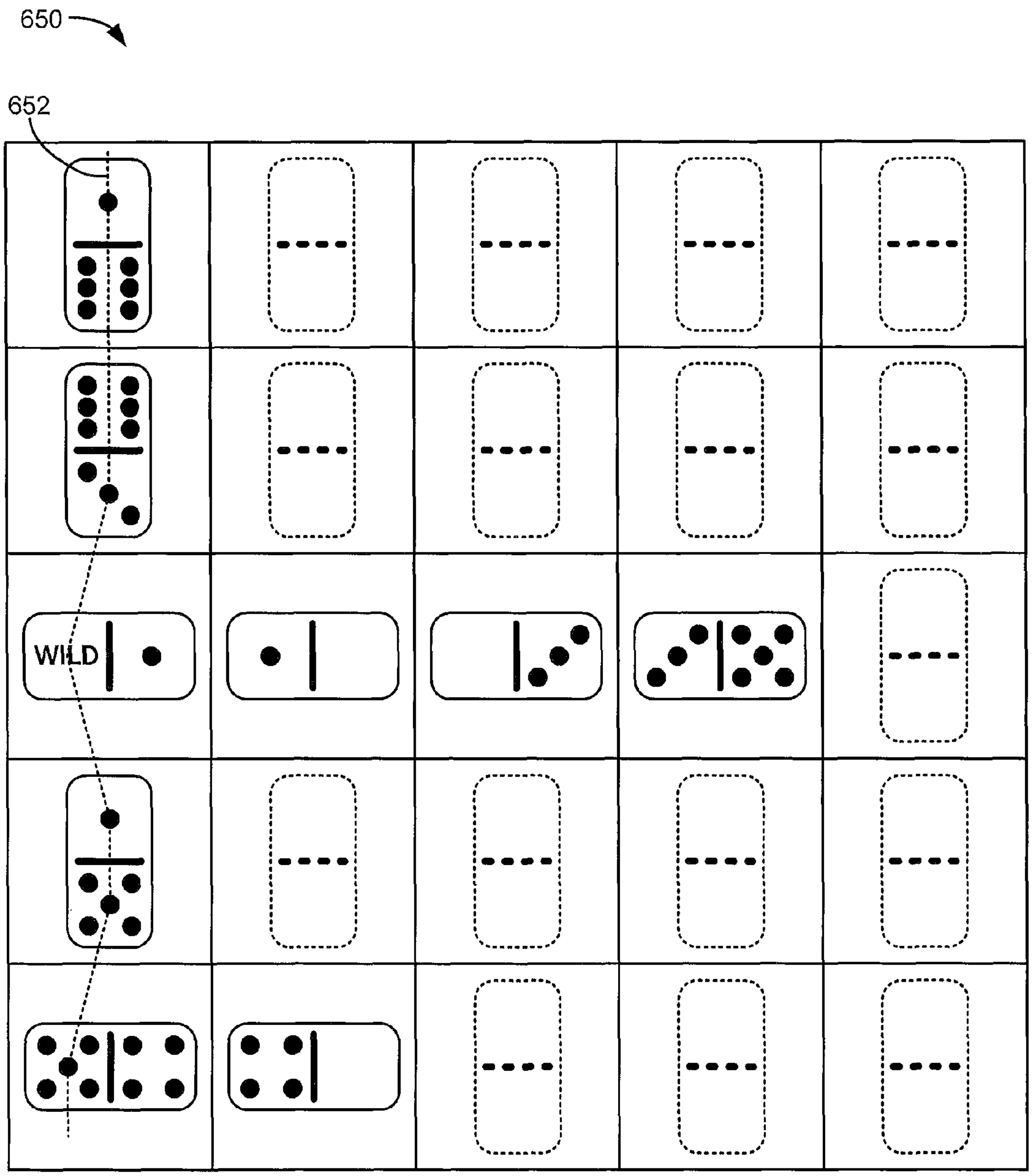

In FIG. 6E, a third rotated symbol payline 652 is shown, according to one embodiment. Third rotated symbol payline 652 includes five symbols (e.g., first domino symbol 602, second domino symbol 604, third domino symbol 606, fourth domino symbol 608, and fifth domino symbol 610).

Figure 6F:
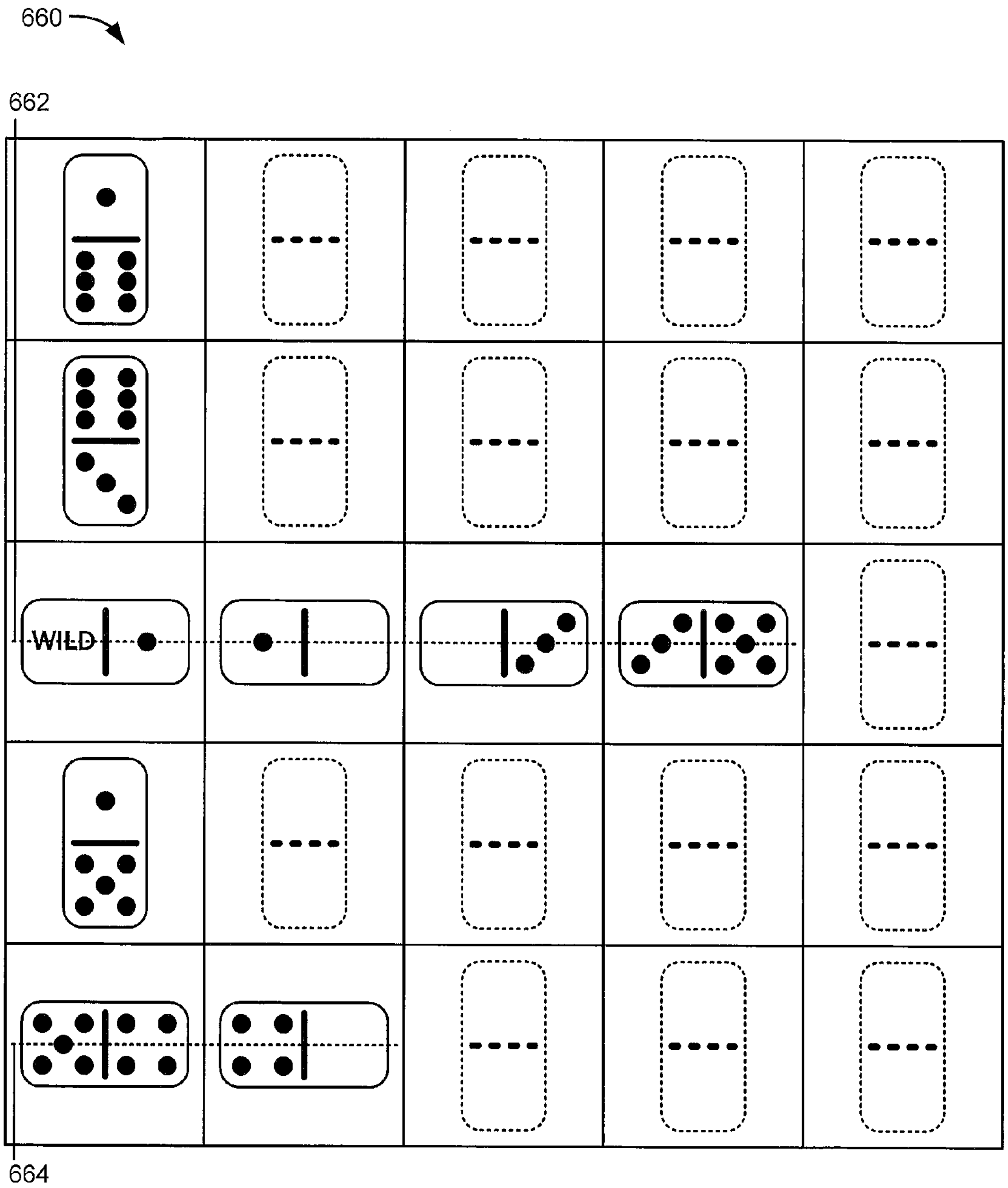

In FIG. 6F, a fourth rotated symbol payline 662 and a fifth rotated symbol payline 664 are shown, according to embodiments. Fourth rotated symbol payline 662 includes four symbols (e.g., third domino symbol 606, seventh domino symbol 614, eighth domino symbol 616, and ninth domino symbol 618). Fifth rotated symbols payline 664 includes two symbols (e.g., fifth domino symbol 610 and sixth domino symbol 612).

In FIGS. 7A-7D, various illustrations of utilizing bonus domino symbols are shown, according to various embodiments. In one embodiment, electronic gaming device 100 and/or electronic gaming system 200 may issue one or more bonus dominoes to a player. These bonus dominoes may be issued based on a game level, a betting level, a side bet, randomly, and/or any other criteria.

Figure 7A:
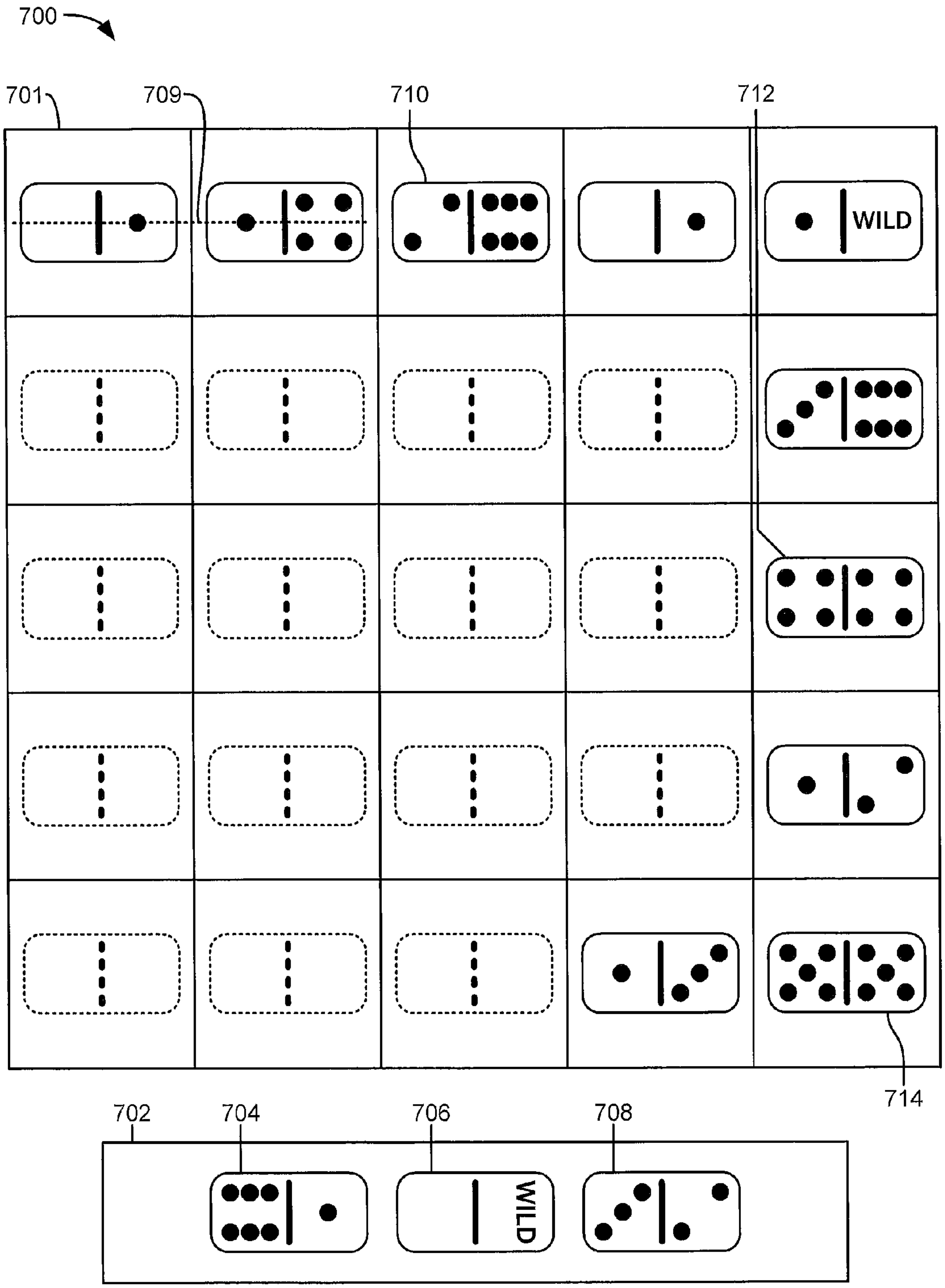
FIGS. 7A-7D are various illustrations of utilizing bonus domino symbols, according to various embodiments.

In FIG. 7A, a bonus screen 700 is shown, according to one embodiment. Bonus screen 700 may include a base game screen 701 and a bonus domino screen 702. Bonus domino screen 702 may include one or more bonus dominoes. The one or more bonus dominoes may be utilized to replace dominoes on base game screen 701. In this example, bonus domino screen 701 may include a first bonus domino 704, a second bonus domino 706, and a third bonus domino 708. In this example, base game screen 701 may include a first blocker domino 710, a second blocker domino 712, and a third blocker domino 714. A blocker domino may be a domino that stops a payline and/or a winning combination from continuing.

In one example, the domino symbols located on base game screen 701 may not form any winning combinations. A non-winning payline 709 was formed by two dominoes. However, in this embodiment, the game requires a formation with three or more dominoes to be a winning combination. In this example, a player may utilize one or more of the bonus dominoes (e.g., first bonus domino 704, second bonus domino 706, and/or third bonus domino 708) to extend non-winning payline 709 into a first replacement winning payline 726 (see FIG. 7B). In this example, if the player replaces first blocker domino 710 with second bonus domino 706, then first replacement winning payline 726 may be formed. First replacement winning payline 726 includes a formation that has six domino symbols. In this example, a rotating option was activated, which allowed one or more dominoes (e.g., a first rotating domino 722 and a second rotating domino 724) to change positions. Second bonus domino 706 has been removed from bonus domino screen 702, which may be shown as a first blank space 707.

Figure 7B:
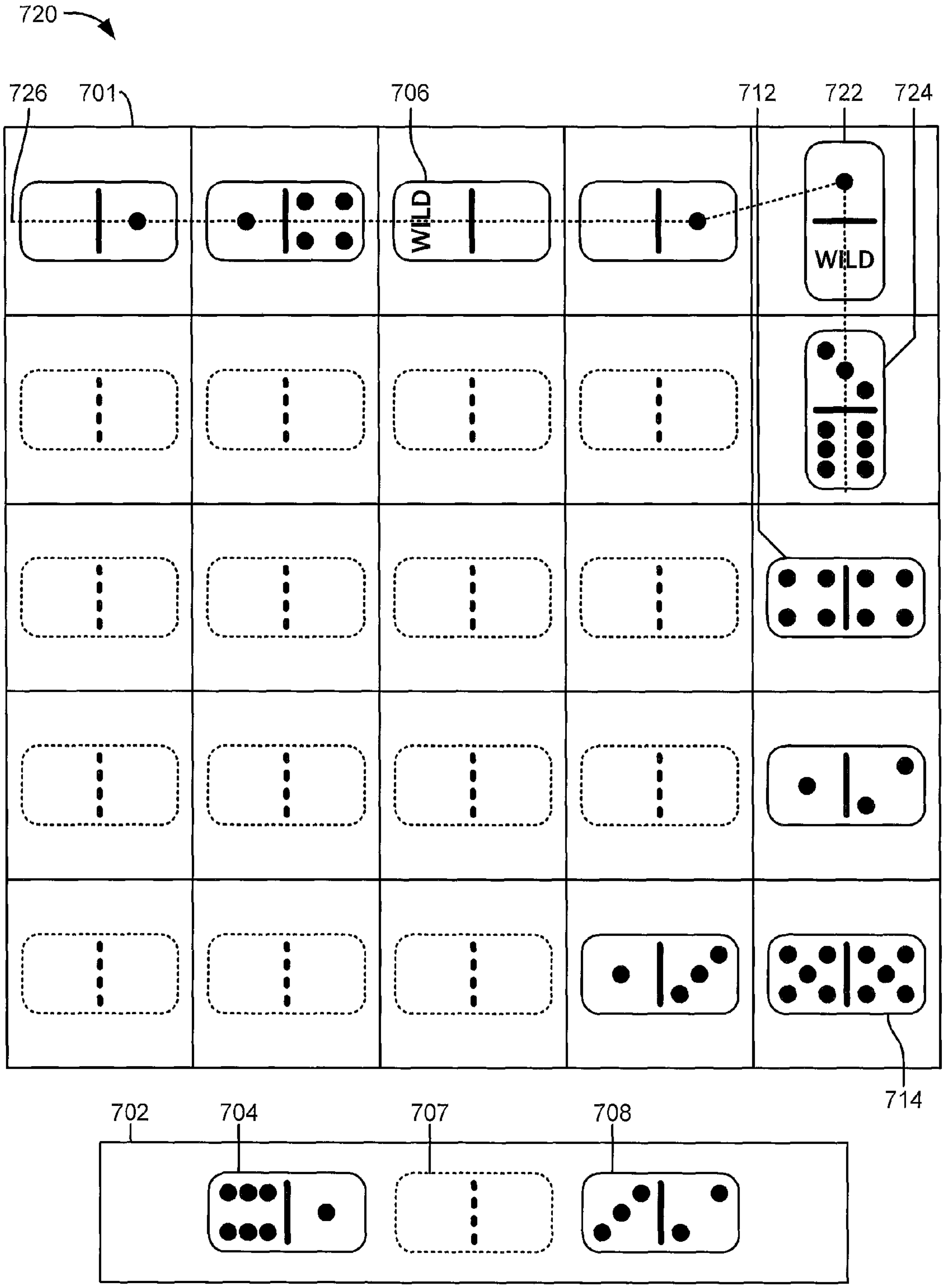

In FIG. 7B, first replacement winning payline 726 has been stopped by second blocker domino 712. In this example, a player may utilize one or more of the bonus dominoes (e.g., first bonus domino 704 and/or third bonus domino 708) to extend first replacement winning payline 726 into a second replacement winning payline 736 (see FIG. 7C). In this example, if the player replaces second blocker domino 712 with first bonus domino 704, then second replacement winning payline 736 may be formed. Second replacement winning payline 736 includes a formation that has eight domino symbols. In this example, a rotating option was activated, which allowed one or more dominoes (e.g., first rotating domino 722, second rotating domino 724, first bonus domino 704, and a third rotating domino 732) to change positions. First bonus domino 704 has been removed from bonus domino screen 702, which may be shown as a second blank space 705.

Figure 7C:
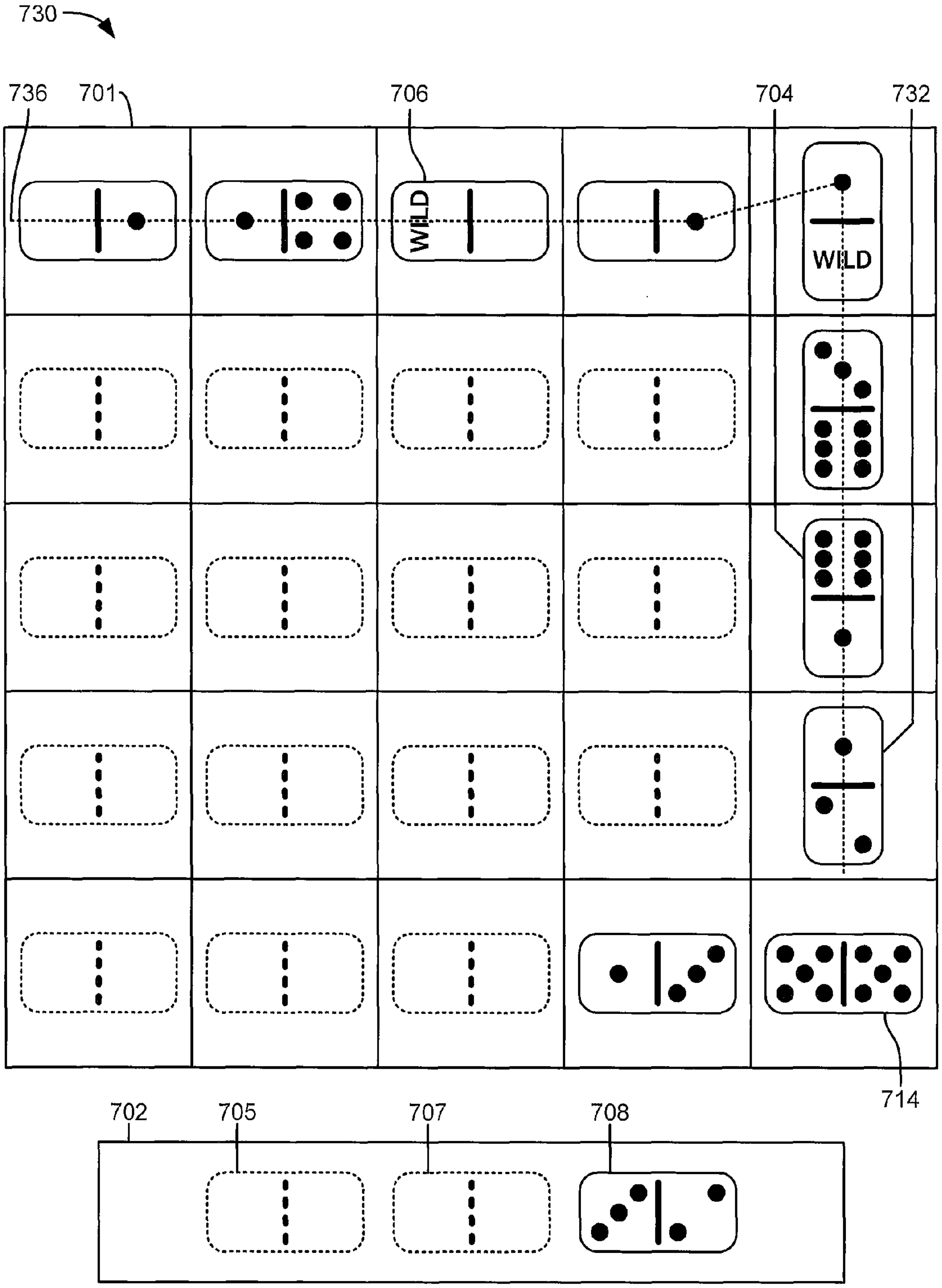

In FIG. 7C, second replacement winning payline 736 has been stopped by third blocker domino 714. In this example, a player may utilize the bonus domino (e.g., third bonus domino 708) to extend second replacement winning payline 736 into a third replacement winning payline 746 (see FIG. 7D). In this example, if the player replaces third blocker domino 714 with third bonus domino 708, then third replacement winning payline 746 may be formed. Third replacement winning payline 746 includes a formation that has ten domino symbols. In this example, a rotating option was activated, which allowed one or more dominoes (e.g., first rotating domino 722, second rotating domino 724, first bonus domino 704, and third rotating domino 732) to change positions. Third bonus domino 708 has been removed from bonus domino screen 702, which may be shown as a third blank space 711.

Figure 7D:
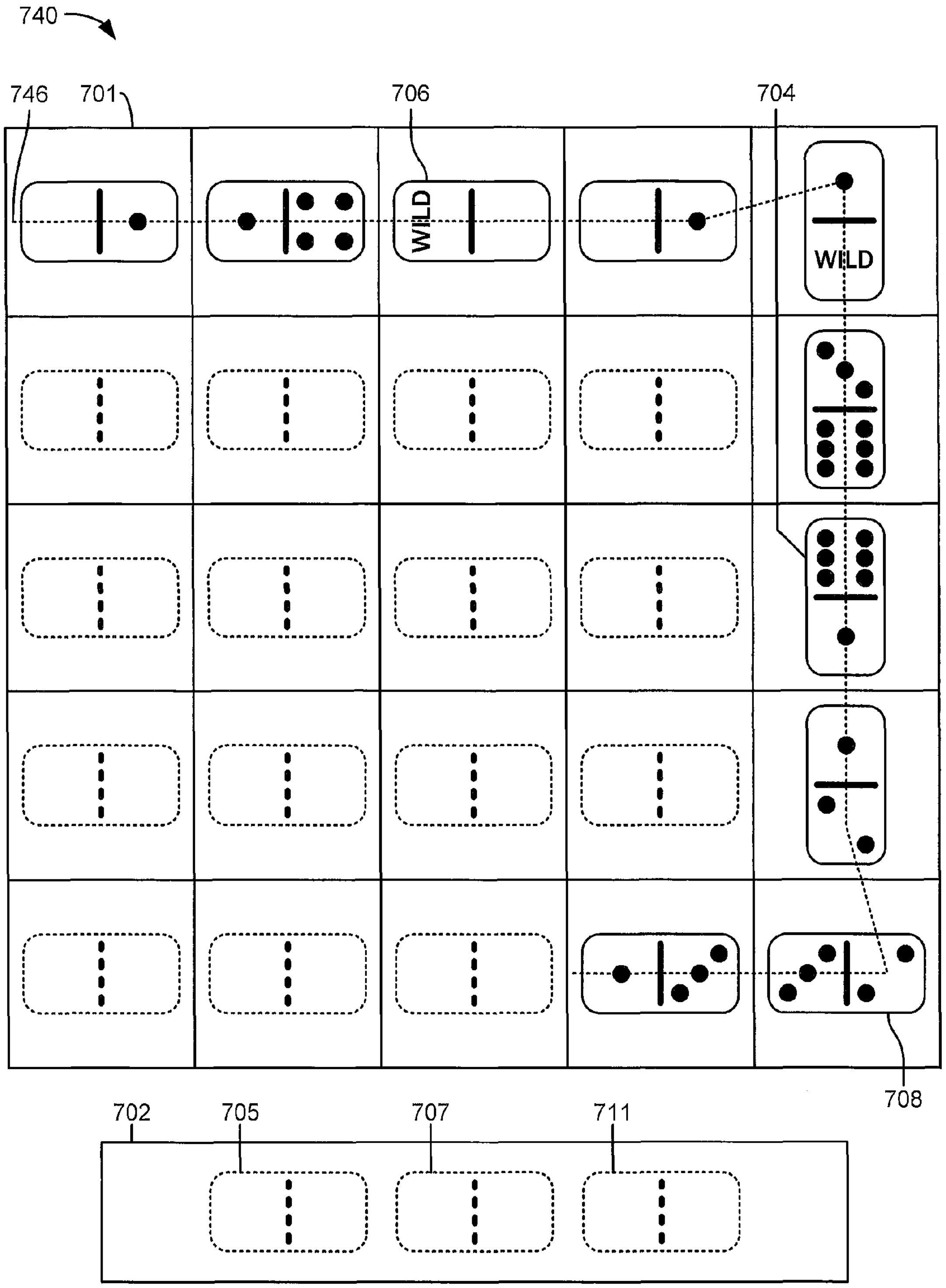

In FIG. 7D, third replacement winning payline 746 was formed by utilizing three replacement dominoes (e.g., first replacement domino 704, second replacement domino 706, and third replacement domino 708) to replace three blocker dominoes (e.g., first blocker domino 710, second blocker domino 712, and third blocker domino 714). The player, electronic gaming device 100, and/or electronic gaming system 200 may replace one or more dominoes (e.g., blocker dominoes) with one or more dominoes (e.g., replacement dominoes). Further, the replacement may be completed in one step or in multiple steps as shown above. In addition, a player may select to only replace one domino (or two dominoes) and keep the rest of their replacement dominoes for later game play.

Figure 8:
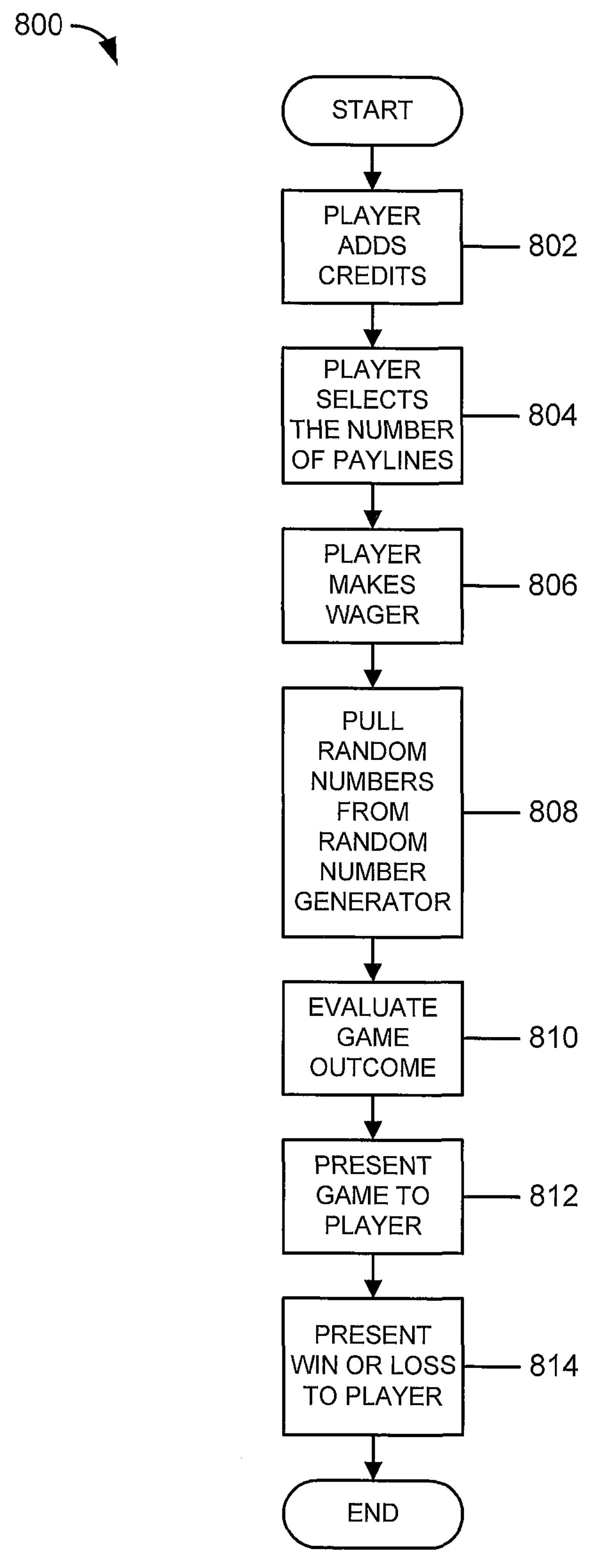
FIG. 8 is a process flowchart of game play, according to one embodiment.

In FIG. 8, a first process flowchart 800 of game play is shown, according to one embodiment. The method may include the game play starting. The method may include the device and/or system receiving credits (step 802). The method may include the device and/or system receiving payline selections from a player (step 804). The method may include the device and/or system receiving a wager (step 806). The method may include the device and/or system pulling one or more random numbers from a random number generator (step 808). The method may include the device and/or system evaluating the game outcome (step 810). The method may include presenting the game (step 812). The method may include displaying the game outcome (step 814). The method may end.

Figure 9:
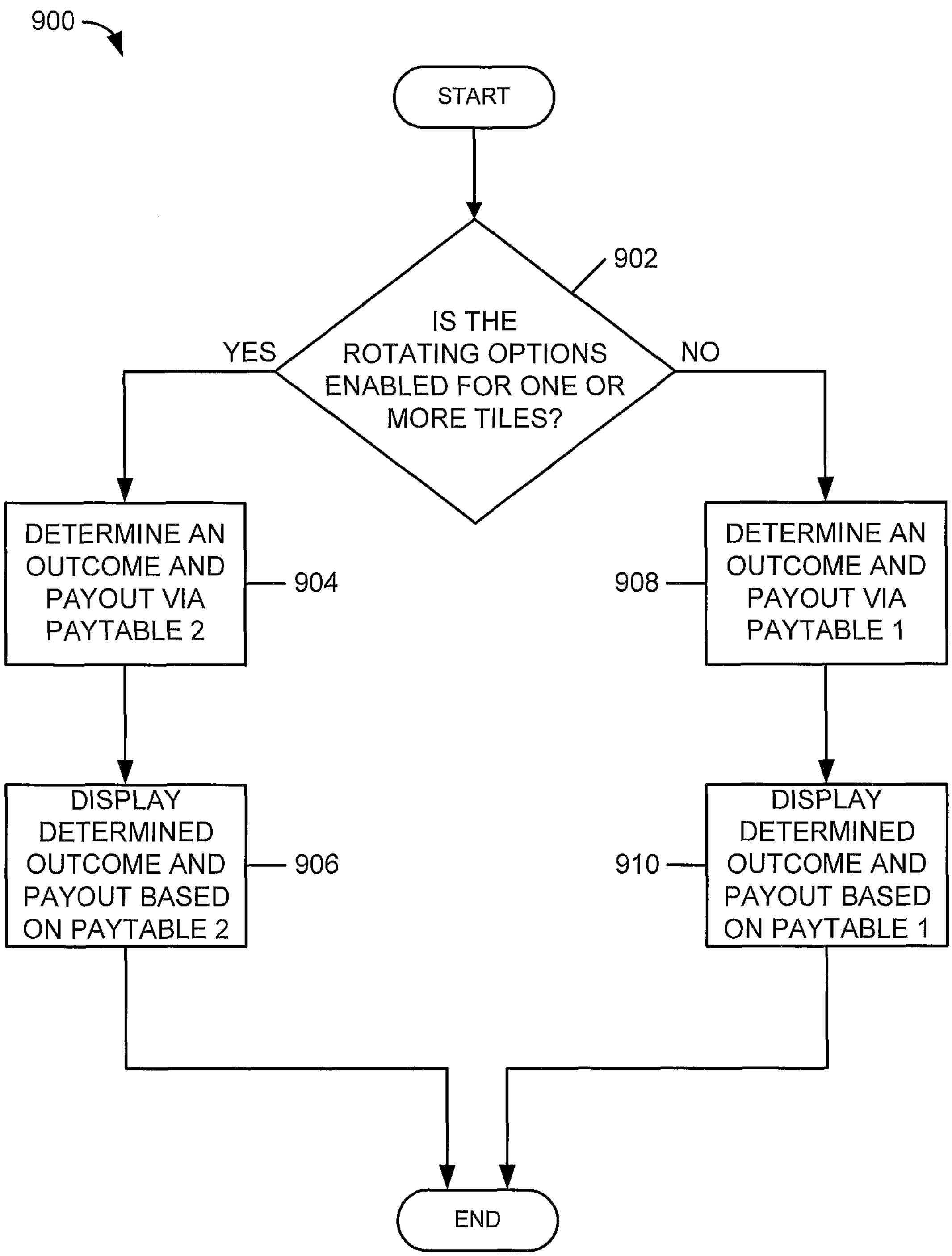
FIG. 9 is another process flowchart of game play, according to one embodiment.

FIG. 9 shows a second process flowchart 900, according to one embodiment. The method may include starting game play. Further, the method may include the device and/or system determining whether the rotating options are enabled for one or more tiles (step 902). If the rotating options are not enabled for one or more tiles, then the method may determine an outcome and a payout based on a first paytable (step 908). The method may then display the determined outcome and payout based on the first paytable (step 910). The method may then end. If the rotating options are enabled for one or more tiles, then the method may determine an outcome and a payout based on a second paytable (step 906). The method may then end.

The first paytable may be structured to have decreased payouts (as compared to the second paytable) based on one or more predetermined symbol configurations. For example, four symbols in a winning combination may have an associated reward of 100 credits on the first paytable while the same four symbols in the winning combination may have an associated reward of 125 credits on the second paytable.

The first paytable may be structured to have increased payouts (as compared to the second paytable) based on one or more predetermined symbol configurations. For example, four symbols in a winning combination may have an associated reward of 200 credits on the first paytable while the same four symbols in the winning combination may have an associated reward of 150 credits on the second paytable.

Figure 10:
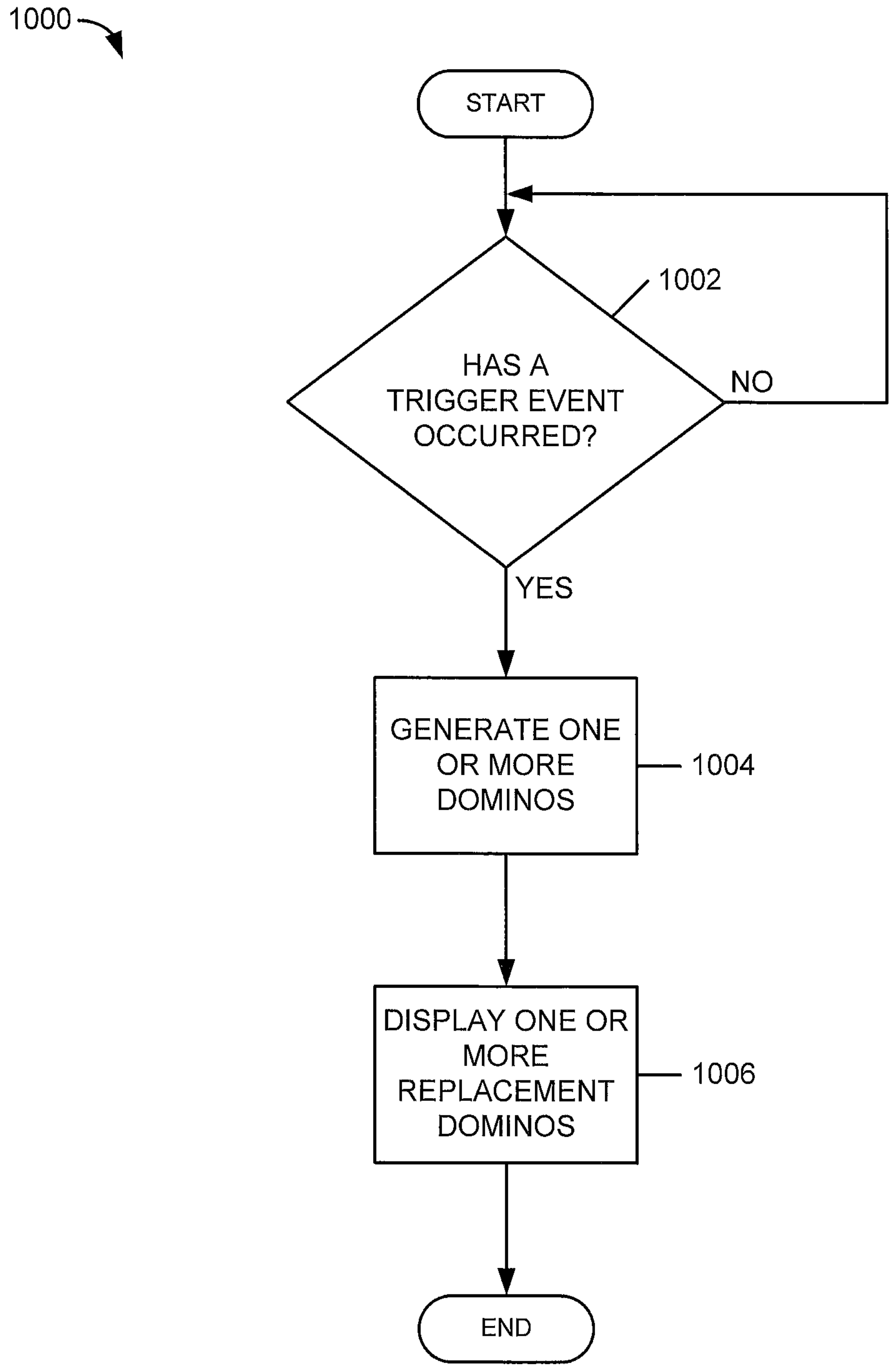
FIG. 10 is another process flowchart of game play, according to one embodiment.

FIG. 10 shows a third process flowchart 1000, according to one embodiment. The method may include starting game play. The method may include the device and/or system determining whether one or more trigger event has occurred (step 1002). If no trigger event has been determined, then the method may loop back to step 1002. If one or more trigger events have occurred, then the method may generate one or more bonus dominoes (step 1004). The method may display the one or more replacement dominoes (step 1006). The method may end.

Figure 11:
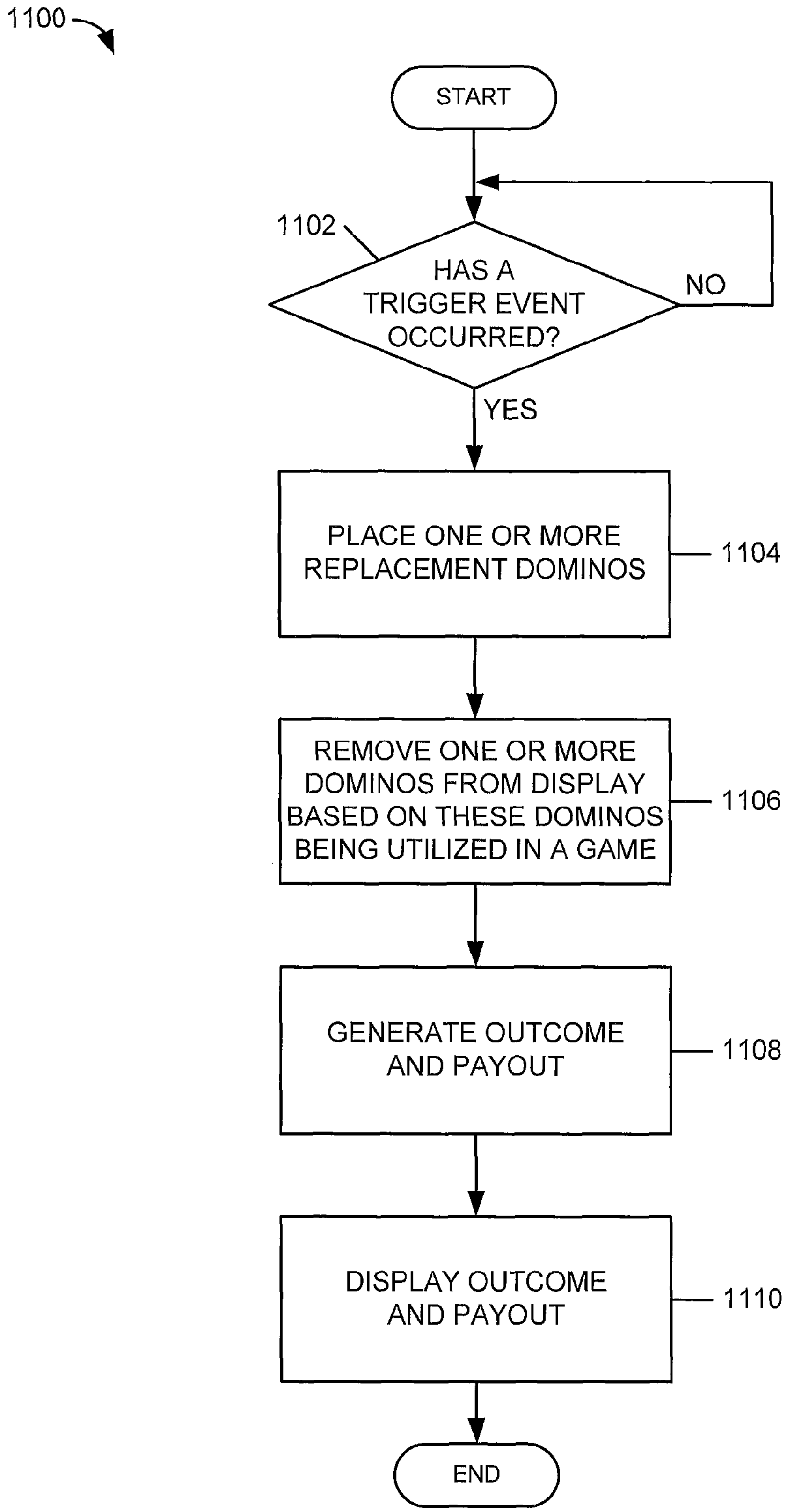
FIG. 11 is another process flowchart of game play, according to one embodiment.

FIG. 11 shows a fourth process flowchart 1100, according to one embodiment. The method may include starting game play. The method may include the device and/or system determining whether one or more trigger event has occurred (step 1102). If no trigger event has been determined, then the method may loop back to step 1102. If one or more trigger events have occurred, then the method may place one or more replacement dominoes (step 1104). The method may remove/replace one or more dominoes from the display based on these replacement dominoes being utilized in a game (step 1106). The method may generate an outcome and a payout (step 1108). The method may display an outcome and a payout (step 1110). The method may end.

Figure 12:
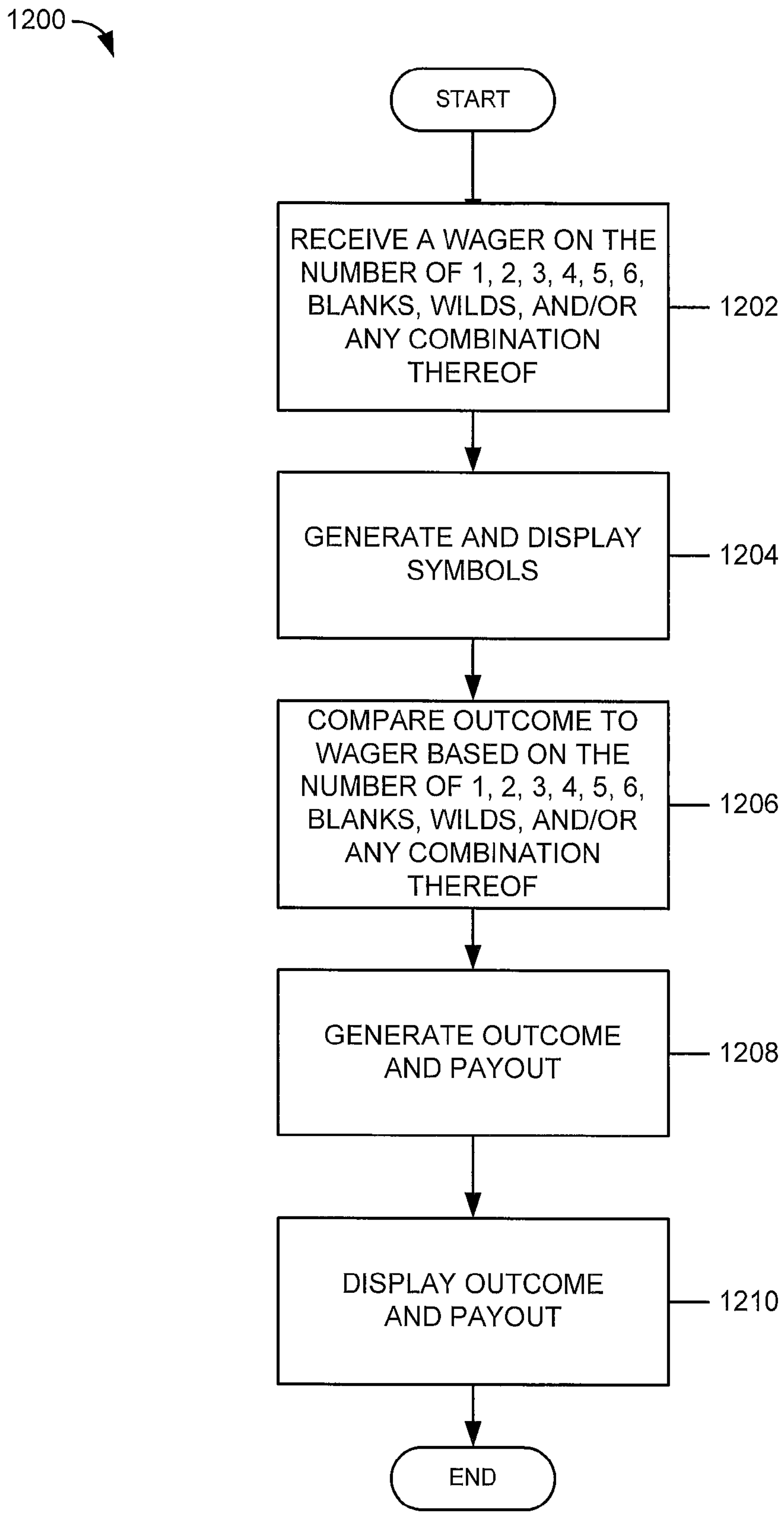
FIG. 12 is another process flowchart of game play, according to one embodiment.

FIG. 12 shows a fourth process flowchart 1200, according to one embodiment. The method may include starting game play. The method may receive a wager on the number of 1, 2, 3, 4, 5, 6, a blank, a wild, and/or any combination thereof (step 1202). The method may generate and display symbols (step 1204). The method may compare an outcome to the wager based on the number of 1, 2, 3, 4, 5, 6, a blank, a wild, and/or any combination thereof (step 1206). The method may generate an outcome and a payout based on the comparison (step 1208). The method may display an outcome and a payout (step 1210). The method may end.

Domino symbol interaction may be governed by any domino game structure, domino game version, and/or any portion thereof. Some structures may be Blind Hughie, Block Dominoes, Chickenfoot, Concentration, Cyprus, Draw Dominoes, Fortress, Matador, Mexican Train, Sebastopol, Tiddle-A-Wink, Tiddly Wink, All Fives, All Threes, Bergen, Flower & Scorpion, Muggins, Sniff, Forty-Two, Moon, Texas 42, Build Up, Chinese Dominoes, Solitaire, and Tri-Ominos.

The plurality of reels may form a 5-by-5 matrix, a 3-by-5 matrix, a 4-by-5 matrix, a 4-by-3 matrix, a 5-by-3 matrix, or any number-by-any number matrix.

In one embodiment, the electronic gaming device may include a plurality of reels, a memory, and a processor. The plurality of reels may include one or more areas. The processor may generate one or more symbols to be located in the one or more areas. The one or more symbols may include one or more domino symbols. The processor may determine a payout based on a domino game structure.

In another example, the electronic gaming device may include a display which displays the one or more domino symbols in the one or more areas. The processor may rotate at least one of the one or more domino symbols. The processor may determine the payout based on data relating to the one or more rotated domino symbols.

In an example, a first blocker symbol may be located in the one or more areas. The processor may replace the first blocker symbol with a first replacement symbol based on a received replacement data. The received replacement data may be obtained for a player, the electronic gaming device, and/or the electronic gaming system. The processor may determine the payout based on the first replacement symbol.

In another example, a first blocker symbol and a second blocker symbol may be located in the one or more areas. The processor may replace at least one of the first blocker symbol and the second blocker symbol with at least one of a first replacement symbol and a second replacement symbol based on a received replacement data.

In another embodiment, a method of providing gaming options via an electronic gaming device may include displaying one or more domino symbols. The method may also include determining one or more interactions between the one or more domino symbols. Further, the method may include determining a payout based on the one or more interactions and a domino gaming structure.

In another example, there may be one or more rotating domino symbols included in the one or more domino symbols. The method may include determining one or more rotating interactions between the one or more domino symbols and the one or more rotating domino symbols. The method may include determining the payout based on the one or more rotating interactions.

In another example, the method may include displaying one or more blocker symbols (e.g., a first blocker symbol and a second blocker symbol). The method may include replacing at least one of the blocker symbols (e.g., the first blocker symbol and the second blocker symbol) with at least one of a plurality of replacement symbols (e.g., a first replacement symbol and a second replacement symbol). The method may also include determining the payout based on a replacement of at least one of the blocker symbols (e.g., the first blocker symbol and the second blocker symbol).

In an embodiment, the electronic gaming system may include a server which may include a server memory and a server processor. The server processor may display a plurality of reels which include one or more symbols. The one or more symbols may include one or more domino symbols. The server processor may determine a payout based on a domino game structure.

In another example, the server processor may rotate at least one of the one or more domino symbols. The server processor may determine the payout based on one or more rotated domino symbols. The server processor may modify a game configuration based on a player preference data.

Gaming system may be a "state-based" system. A state-based system stores and maintains the system's current state in a non-volatile memory. Therefore, if a power failure or other malfunction occurs, the gaming system will return to the gaming system's state before the power failure or other malfunction occurred when the gaming system is powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system is different than a Personal Computer ("PC") because a PC is not a state-based machine. A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example"

should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. An electronic gaming device comprising:

a credit device configured to accept an item associated with a monetary value;

a user input device configured to enable a player to select a wager amount and initiate a game play where the wager amount is subtracted from a credit balance, the credit balance being funded at least in part via the credit device;

a plurality of display areas;

a memory;

a processor configured to generate and cause to be displayed in the plurality of display areas one or more symbols, the one or more symbols include one or more domino symbols, the processor configured to determine a domino payout based on a domino game structure and one or more replacement domino symbols; and wherein one of the one or more domino symbols located in the plurality of display areas is a first domino blocker symbol, the first domino blocker symbol inhibiting a winning combination;

wherein the processor is configured to replace the first domino blocker symbol with a first domino replacement symbol based on a received replacement command by the player, the first domino replacement symbol being selected from a replacement domino symbol area located external to the plurality of display areas, wherein the first domino replacement symbol is configured to rotate to form one or more winning combinations; and the processor is configured to generate the domino payout based on a determination that a combination of symbols located in the plurality of display areas including at least said first domino replacement symbol form one or more winning combinations, wherein the determination that the combination of symbols form one or more winning combinations comprises reading the one or more domino symbols and the first domino replacement symbol in a plurality of directions according to a domino payline structure, wherein the domino payline structure evaluates the read symbols according to the domino game structure in the plurality of directions, where the plurality of directions comprise at least a left-to-right direction and a right-to-left direction which comprise horizontally adjacent symbols, and an up-to-down direction, and a down-to-up which comprise vertically adjacent symbols;

wherein the one or more winning combinations includes a first combination which comprises successive adjacent domino symbols in the plurality of display areas containing an equal number of pips on adjacent domino tiles; and wherein the credit balance is increased by any determined award amounts.

2. The electronic gaming device of claim 1, wherein the processor is further configured to rotate at least one of the one or more domino symbols, and wherein the domino payline structure evaluates any rotated domino symbols.

3. The electronic gaming device of claim 2, wherein the replacement domino is a bonus domino selected from a bonus area, said wherein the replacement bonus domino operative to replace a blocker domino in a base display area thereby modifying a non-winning domino payline into a winning domino payline.

4. The electronic gaming device of claim 3, wherein a second blocker symbol is located in one of the plurality of display areas and wherein the processor is configured to replace the first blocker symbol and the second blocker symbol with the first domino replacement symbol and a second domino replacement symbol, respectively, based on at least one replacement command.

5. The electronic gaming device of claim 1, wherein the domino game structure is selected according to one of the following standard domino game structures: Blind Hughie, Block Dominoes, Chickenfoot, Concentration, Cyprus, Draw Dominoes, Fortress, Matador, Mexican Train, Sebastopol, Tiddle-A-Wink, Tiddly Wink, All Fives, All Threes, Bergen, Flower & Scorpion, Muggins, Sniff, Forty-Two, Moon, Texas 42, Build Up, Chinese Dominoes, Solitaire, and Tri-Ominos.

6. The electronic gaming device of claim 1, wherein the domino payline structure evaluates any rotated dominos and replacement dominos and where the left-to-right direction and right-to-left direction, and up-to-down direction and down-to-up direction comprise diagonally adjacent symbols.

7. The electronic gaming device of claim 1, wherein each of said domino symbols have a first end and a second end each bearing a domino value, wherein at least two domino symbols are positioned vertically so that each first end is positioned upward and each second end is positioned downward, and wherein at least one domino payline structure evaluates a combination of a domino value of the first end of at least one first domino symbol and with a domino value of second end of at least one second domino symbol positioned to a side of the at least one first domino symbol.

8. The electronic gaming device of claim 7, wherein said combination requires said dominos values of said first end and said second end to be the same.

9. A method of providing gaming options via an electronic gaming device, where the electronic gaming device includes one or more processors, the method comprising:

receiving via a credit device an item associated with a monetary value;

establishing via the one or more processors a credit balance based at least in part on the received item;

receiving via a wager button a wager amount on a play of a game, wherein the wager amount is deducted from the credit balance;

displaying via the one or more processors, in one or more symbol areas on a plurality of reels, one or more domino symbols, including a first domino blocker symbol, wherein the first blocker symbol inhibits a winning combination;

replacing the first domino blocker symbol with a first domino replacement symbol based on a command received from a player, the first domino replacement symbol being selected from a replacement domino symbol area located external to the plurality of reels, wherein the first domino replacement symbol is configured to rotate to form one or more winning combinations;

determining via the one or more processors a domino payout based on the one or more domino symbols, including said first domino replacement symbol forming one of the winning combinations according to a domino payline structure, wherein the domino payline structure evaluates the one or more domino symbols including said first domino replacement symbol according to a domino game structure, wherein the payline structure evaluates the one or more domino symbols and the first domino replacement symbol in a plurality of directions, where the plurality of directions comprise at least a left-to-right direction and a right-to-left direction which comprise horizontally adjacent symbols, and an up-to-down direction, and a down-to-up which comprise vertically adjacent symbols;

wherein the one or more winning combinations includes a first combination which comprises successive adjacent domino symbols in the plurality of display areas containing an equal number of pips on adjacent domino tiles; and wherein the credit balance is increased by any determined award amounts.

10. The method of claim 9, wherein one or more rotating domino symbols are included in the one or more domino symbols and wherein the step of determining a domino payout includes any rotated dominos.

11. The method of claim 10, further comprising determining via the one or more processors one or more rotating interactions between one or more of the one or more domino symbols which do not rotate and the one or more rotating domino symbols and wherein domino game structure is selected according to one of the following standard domino game structures: Blind Hughie, Block Dominoes, Chickenfoot, Concentration, Cyprus, Draw Dominoes, Fortress, Matador, Mexican Train, Sebastopol, Tiddle-A-Wink, Tiddly Wink, All Fives, All Threes, Bergen, Flower & Scorpion, Muggins, Sniff, Forty-Two, Moon, Texas 42, Build Up, Chinese Dominoes, Solitaire, and Tri-Ominos.

12. The method of claim 11, further comprising determining via the one or more processors the domino payout based on the one or more rotating interactions.

13. The method of claim 9, further comprising displaying via the one or more processors a second domino blocker symbol and wherein the step of replacing the blocker symbol further includes replacing the first blocker symbol and the second blocker symbol with the first domino replacement symbol and a second domino replacement symbol, respectively.

14. The method of claim 9, wherein each of said domino symbols have a first end and a second end each bearing a domino value, wherein at least two domino symbols are positioned vertically so that each first end is positioned upward and each second end is positioned downward, and wherein at least one domino payline structure evaluates a combination of a domino value of the first end of at least one first domino symbol and with a domino value of second end of at least one second domino symbol positioned to a side of the at least one first domino symbol.

15. An electronic gaming system comprising:

a credit device configured to accept an item associated with a monetary value;

a user input device configured to enable a player to select a wager amount and initiate a game play, wherein the wager amount is subtracted from a credit balance funded at least in part via the credit device;

a display comprising a display area;

a server including a server memory and a server processor, the server processor configured to display, one or more symbols, within said display area, the one or more symbols including one or more domino symbols, said symbols further comprising a domino blocker symbol operative to inhibit a winning combination;

a plurality of domino replacement symbols;

wherein the sever processor is configured to replace said domino blocker symbol with a first domino replacement symbol based on a received replacement command from the player; wherein the first domino replacement symbol is configured to rotate to form one or more winning combinations; and the server processor configured to determine a domino payout based on a domino game structure and the first domino replacement symbol, the server processor configured to generate the domino payout based on a determination that a combination of symbols located in the display area, including said first domino replacement symbol form one or more winning combinations according to a domino payline structure, wherein the domino payline structure evaluates the read symbols according to the domino game structure based on reading the one or more domino symbols and the first domino replacement symbol in a plurality of directions, where the plurality of directions comprise at least a left-to-right direction and a right-to-left direction which comprise horizontally adjacent symbols, and an up-to-down direction, and a down-to-up which comprise vertically adjacent symbols;

wherein the one or more winning combinations includes a first combination which comprises successive adjacent domino symbols in the plurality of display areas containing an equal number of pips on adjacent domino tiles; and wherein the credit balance is increased by any determined award amounts.

16. The electronic gaming system of claim 15, wherein the server processor is further configured to rotate at least one of the one or more domino symbols.

17. The electronic gaming system of claim 16, wherein the server processor is further configured to determine the domino payout based on the one or more rotated domino symbols and wherein the domino game structure is selected according to one of the following standard domino game structures: Blind Hughie, Block Dominoes, Chickenfoot, Concentration, Cyprus, Draw Dominoes, Fortress, Matador, Mexican Train, Sebastopol, Tiddle-A-Wink, Tiddly Wink, All Fives, All Threes, Bergen, Flower & Scorpion, Muggins, Sniff, Forty-Two, Moon, Texas 42, Build Up, Chinese Dominoes, Solitaire, and Tri-Ominos.

18. The electronic gaming system of claim 15, wherein the server processor is further configured to modify a game configuration based on a player preference data.

19. The electronic gaming device of claim 16, wherein the server processor is further configured to determine the domino payout based on the one or more rotated domino symbols.

20. The electronic gaming device of claim 19, wherein one or more payouts are determined based on the rotation of the one or more domino symbols in at least three different angles.

21. The electronic gaming device of claim 15, wherein each of said domino symbols have a first end and a second end each bearing a domino value, wherein at least two domino symbols are positioned vertically so that each first end is positioned upward and each second end is positioned downward, and wherein at least one domino payline structure evaluates a combination of a domino value of the first end of at least one first domino symbol and with a domino value of second end of at least one second domino symbol positioned to a side of the at least one first domino symbol.

* * * * *